US010671989B2

(12) United States Patent
Watanabe

(10) Patent No.: US 10,671,989 B2
(45) Date of Patent: *Jun. 2, 2020

(54) SYSTEM FOR TRANSMITTING ELECTRONIC RECEIPT

(71) Applicant: Toshiba Tec Kabushiki Kaisha, Tokyo (JP)

(72) Inventor: Naoki Watanabe, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,010

(22) Filed: Jul. 30, 2019

(65) Prior Publication Data

US 2019/0354949 A1    Nov. 21, 2019

Related U.S. Application Data

(60) Continuation of application No. 16/055,774, filed on Aug. 6, 2018, now Pat. No. 10,395,229, which is a
(Continued)

(30) Foreign Application Priority Data

May 23, 2006  (JP) ................................. 2006-143074
May 23, 2006  (JP) ................................. 2006-143075

(51) Int. Cl.
*G06Q 20/20* (2012.01)
*G06Q 20/04* (2012.01)
(Continued)

(52) U.S. Cl.
CPC ....... *G06Q 20/202* (2013.01); *G06Q 20/0453* (2013.01); *G06Q 20/20* (2013.01);
(Continued)

(58) Field of Classification Search
USPC ............................................ 705/21
See application file for complete search history.

(56) References Cited

U.S. PATENT DOCUMENTS 6,484,097 B2    11/2002  Fuchs et al.
6,865,546 B1    3/2005   Song
(Continued)

FOREIGN PATENT DOCUMENTS

JP    09-160977       6/1997
JP    2000-184087 A   6/2000
(Continued)

OTHER PUBLICATIONS

Communication dated Jan. 6, 2009 (with translation) from Japanese Patent Office regarding related application No. 2006-143075.
(Continued)

*Primary Examiner* — Garcia Ade
(74) *Attorney, Agent, or Firm* — Harness, Dickey & Pierce, P.L.C.

(57) ABSTRACT

On receiving simplified settlement data generated form settlement data and ID data for downloading electronic-receipt data from an electronic-receipt server, both from a settlement-processing apparatus, a portable terminal records the simplified settlement data in association with the ID data. The display unit of the portable terminal displays the simplified settlement data thus recorded. The portable terminal downloads electronic-receipt data from the electronic-receipt server by using the ID data recorded in association with the simplified settlement data, when the input unit is operated, thereby commanding that the electronic receipt related to the simplified settlement data displayed by the display unit should be downloaded. The electronic-receipt data is recorded in the electronic-receipt recording unit. The display unit displays the electronic receipt on the basis the elec-
(Continued)

tronic-receipt data recorded in the electronic-receipt recording unit.

7 Claims, 19 Drawing Sheets

Related U.S. Application Data continuation of application No. 14/808,719, filed on Jul. 24, 2015, now Pat. No. 10,068,214, which is a division of application No. 14/139,199, filed on Dec. 23, 2013, now abandoned, which is a continuation of application No. 13/313,614, filed on Dec. 7, 2011, now abandoned, which is a division of application No. 11/804,940, filed on May 21, 2007, now abandoned.

(51) Int. Cl.
*G06Q 20/32* (2012.01)
*G06Q 30/06* (2012.01)
*G07G 5/00* (2006.01)
*G06Q 30/02* (2012.01)

(52) U.S. Cl.
CPC ........... *G06Q 20/209* (2013.01); *G06Q 20/32* (2013.01); *G06Q 20/3221* (2013.01); *G06Q 30/06* (2013.01); *G07G 5/00* (2013.01)

(56) References Cited

U.S. PATENT DOCUMENTS

| | | | |
|---|---|---|---|
| 6,988,657 B1 | 1/2006 | Singer et al. | |
| 7,014,107 B2 | 3/2006 | Singer et al. | |
| 7,308,356 B2 | 12/2007 | Melaku et al. | |
| 7,349,871 B2* | 3/2008 | Labrou | G06Q 20/02 705/26.35 |
| 7,599,855 B2 | 10/2009 | Sussman | |
| 7,634,445 B1 | 12/2009 | Langer et al. | |
| 7,720,717 B2* | 5/2010 | Fujita | G06Q 20/10 705/26.35 |
| 7,729,984 B1 | 6/2010 | Nappi | |
| 8,589,259 B2 | 11/2013 | Kunieda et al. | |
| 2002/0147688 A1* | 10/2002 | Arai | G06Q 30/02 705/52 |
| 2003/0144793 A1 | 7/2003 | Melaku et al. | |
| 2004/0147251 A1* | 7/2004 | Nakayama | G06Q 30/06 455/414.2 |
| 2004/0181454 A1 | 9/2004 | Manno | |
| 2005/0256802 A1 | 11/2005 | Ammermann et al. | |
| 2006/0100933 A1 | 5/2006 | Fujita et al. | |
| 2006/0271498 A1 | 11/2006 | Iwaguchi et al. | |
| 2007/0106565 A1 | 5/2007 | Coelho | |
| 2007/0109262 A1* | 5/2007 | Oshima | G06Q 20/045 345/156 |
| 2008/0120129 A1 | 5/2008 | Seubert et al. | |
| 2008/0228591 A1 | 9/2008 | Watanabe et al. | |

FOREIGN PATENT DOCUMENTS

| | | | |
|---|---|---|---|
| JP | 2001-312507 A | 11/2001 | |
| JP | 2001-350982 A | 12/2001 | |
| JP | 2002-157540 A | 5/2002 | |
| JP | 2002-183006 A | 6/2002 | |
| JP | 2002-245384 A | 8/2002 | |
| JP | 2003-050957 A | 2/2003 | |
| JP | 2003-077064 A | 3/2003 | |
| JP | 2003-102875 A | 4/2003 | |
| JP | 2003-108835 A | 4/2003 | |
| JP | 2003-187112 A | 7/2003 | |
| JP | 2003-196541 A | 7/2003 | |
| JP | 2003-256514 A | 9/2003 | |
| JP | 2004-102875 A | 4/2004 | |
| JP | 2004-310755 A | 11/2004 | |
| JP | 2004-318504 A | 11/2004 | |
| JP | 2005-141649 A | 6/2005 | |
| JP | 2005-332134 A | 12/2005 | |
| JP | 2006-031655 A | 2/2006 | |
| JP | 2006-504163 A | 2/2006 | |
| JP | 2006-099484 A | 4/2006 | |
| JP | 2006-209243 A | 8/2006 | |

OTHER PUBLICATIONS

Communication dated Oct. 14, 2008 (with translation) from Japanese Patent Office regarding application No. 2007-054836.
Communication (with translation) from Japanese Patent Office regarding application No. 2006-143074 dated Oct. 28, 2008.
Communication (with translation) from Japanese Patent Office regarding application No. 2007-054837 dated Oct. 10, 2008.
Communications (with translations) from Japanese Patent Office regarding related application.
Communication (with translation) from Japanese Patent Office regarding related application dated Apr. 24, 2008.

* cited by examiner

| Name | Price | ... | Merchandise-information access data |
|---|---|---|---|
| Wine 750ml | 9.81 | | http://awinecompany.co.jp/ |
| ⋮ | ⋮ | | |

```
<Receipt>
<Shop>
 <ShopName> OO Store, △△ Branch </ShopName>
 <PurchaseSite href = http://eshop.oostore.jp/>e-OO store </PurchaseSite>
 <CashierID> 0012 </CashierID>
 <Cashier> XY </Cashier>
</Shop>
<TransactionDateTime> Apr. 1, 2006, 16:00 </TransactionDateTime>
<TransactionID> 1234 </TransactionID>
<Merchandise href = " http://oostore.jp/veg/cabbage.html ">
 <MerchandiseName> Cabbage </MerchandiseName>
 <ItemName> </ItemName>
 <Price> 0.88 </Price>
 <PurchaseSiteID> 0100256 </PurchaseSiteID>
</Merchandise>
<Merchandise href = " http://oostore.jp/meat/porkrib.html ">
 <MerchandiseName> Pork 200g </MerchandiseName>
 <ItemName> </ItemName>
 <Price> 1.98 </Price>
 <PurchaseSiteID> 0200132 </PurchaseSiteID>
</Merchandise>
<Merchandise href = " ">
 <MerchandiseName> detergent 500ml </MerchandiseName>
 <ItemName> </ItemName>
 <Price> 2.58 </Price>
 <PurchaseSiteID> 0503582 </PurchaseSiteID>
</Merchandise>
<Merchandise href = " http://awinecompany.co.jp/ ">
 <MerchandiseName> Wine 750ml </MerchandiseName>
 <ItemName> </ItemName>
 <Price> 9.81 </Price>
 <PurchaseSiteID> 0512843 </PurchaseSiteID>
</Merchandise>
<TransactionAmount> </TransactionAmount>
<Receipt>
```

F I G. 12

```
<SimplifiedSettlementData>
 <StoreName> OO Store, △△ Branch </ShopName>
 <TransactionDateTime> Apr. 1, 2006, 16:00 </TransactionDateTime>
 <TransactionID> 1234 </TransactionID>
 <TransactionAmount> 15/25 </TransactionAmount>
</SimplifiedSettlementData>
```
F I G. 13
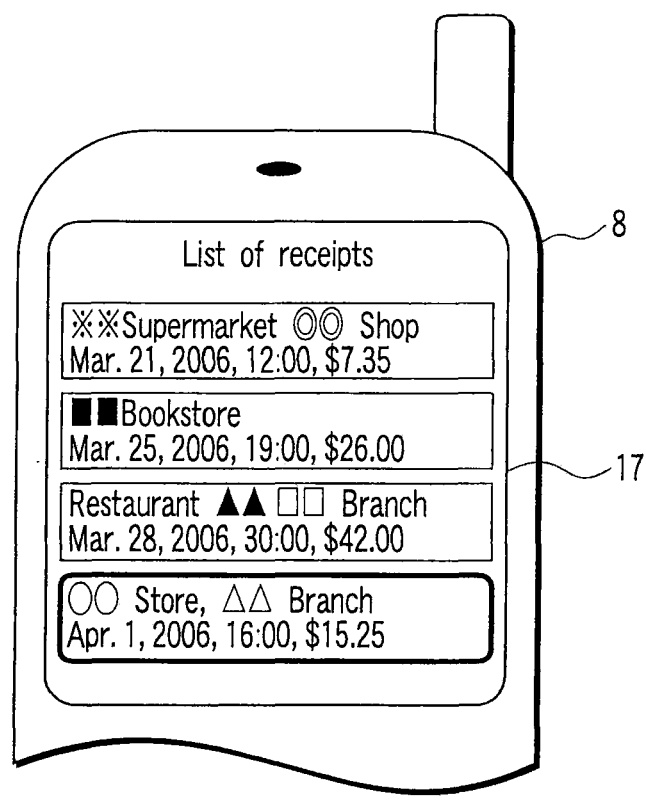
F I G. 14

| Name | Price | ··· | Purchase-site ID |
|---|---|---|---|
| Wine 750ml | 9.81 | | 0512843 |
| ⋮ | ⋮ | | |

| Site ID | Merchandise | Related merchandise | Date recommended |
|---|---|---|---|
| 0512843 | Wine 750ml | Corkscrew | 0 days later |
| | | Label-removing set | 3 days later |
| | | Wine X750mm | 3 days later |
| | | Wine Y750mm | 15 days later |
| | | Wine Z750mm | 30 days later |

SYSTEM FOR TRANSMITTING ELECTRONIC RECEIPT

CROSS-REFERENCE TO RELATED APPLICATIONS

This is a continuation application of U.S. application Ser. No. 16/055,774 filed Aug. 6, 2018, which is a continuation application of U.S. application Ser. No. 14/808,719 filed Jul. 24, 2015, now U.S. Pat. No. 10,068,214 issued Sep. 4, 2018, which is a divisional application of U.S. application Ser. No. 14/139,199 filed Dec. 23, 2013, now abandoned, which is a continuation application of U.S. application Ser. No. 13/313,614 filed Dec. 7, 2011, now abandoned, which is a divisional application of U.S. application Ser. No. 11/804,940 filed May 21, 2007, now abandoned, which is based upon and claims the benefit of priority from prior Japanese Patent Applications No. 2006-143074, filed May 23, 2006; and No. 2006-143075, filed May 23, 2006, all of which are incorporated herein by reference in their entireties.

BACKGROUND OF THE INVENTION

1. Field of the Invention

The present invention relates to a portable terminal, programs for use in the terminal, a settlement apparatus that can perform data communication with the terminal, and a MERCHANDISING-information providing apparatus.

2. Description of the Related Art

Cellular telephones developed in recent years incorporate an external wireless interface that achieves wireless communication by using infrared rays, a non-contact IC card or the like. Settlement applications are now proposed, which enable a telephone user to pay charges and receive coupons by using the wireless interface.

Particularly, it is proposed that shops should electronically input receipts into the cellular telephone when the telephone user pays for whatever he or she has just bought. If the receipts are recorded in the form of electronic data, the user can have his or her household account book kept both electronically and automatically. This is advantageous to the telephone user. This is useful to the shops, too, because the expense involved in issuing paper receipts is saved. In view of this, it is well expected that the electronic-receipt issuing technology will soon come into use.

The amount of data that can be recorded on electronic receipts is almost limitless, unlike the amount of data recordable on conventional paper receipts. If shops issue electronic receipts, they can give the consumers far more merchandise and advertisement information than by issuing conventional paper receipts.

Jpn. Pat. Appln. KOKAI Publication No. 2005-141649, for example, discloses a technique of adding additional information to electronic receipts. In this technique, an electronic receipt with additional information is transferred to the purchaser's personal computer, and the personal computer records the information in the household account book. The purchaser can therefore review the additional information on the personal computer.

Thus, this technique enables the purchaser to review, on his or her personal computer, the additional information recorded on the electronic receipt. Most personal computers are unusable outdoors. Inevitably, consumers can access such value-added information only indoors. Assume that the merchandize bought is one for outdoor use and that the additional information (i.e., merchandise information) is instructions for solving problems with the merchandise. Then, the purchaser cannot access the information immediately while he or she is using the merchandise in the open.

BRIEF SUMMARY OF THE INVENTION

An object of the present invention is to provide a portable terminal on which the information contained in electronic receipts can be easily reviewed, even in the open, and a system that enables the user of the terminal to review the information.

According to an aspect of this invention, there is provided a portable terminal that comprises: a communications unit which communicates with an electronic-receipt server and a communications unit which communicates with a settlement-processing apparatus. On receiving simplified settlement data generated form settlement data and ID data for downloading electronic-receipt data from an electronic-receipt server, both from a settlement-processing apparatus, the portable terminal records the simplified settlement data in association with the ID data. The display unit of the portable terminal displays the simplified settlement data thus recorded.

The portable terminal downloads electronic-receipt data from the electronic-receipt server by using the ID data recorded in association with the simplified settlement data, when the input unit is operated, thereby commanding that the electronic receipt related to the simplified settlement data displayed by the display unit should be downloaded. The electronic-receipt data is recorded in the electronic-receipt recording unit. The display unit displays the electronic receipt on the basis the electronic-receipt data recorded in the electronic-receipt recording unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and comprise a part of the specification, illustrate embodiments of the invention, and together with the general description given above and the detailed description of the embodiments given below, serve to explain the principles of the invention.

FIG. 12 is a diagram showing the data format of an electronic receipt generated in the first embodiment;

FIG. 13 is a diagram showing the data format of a simplified settlement data item generated in the first embodiment;

FIG. 14 is a diagram showing an example of information, displayed by the display unit of the portable terminal according to the first embodiment;

DETAILED DESCRIPTION OF THE INVENTION

Best modes of practicing the present invention will be described, with the accompanying drawings.

First Embodiment

The first embodiment of the invention will be described with reference to FIGS. 1 to 16.

Figure 1:
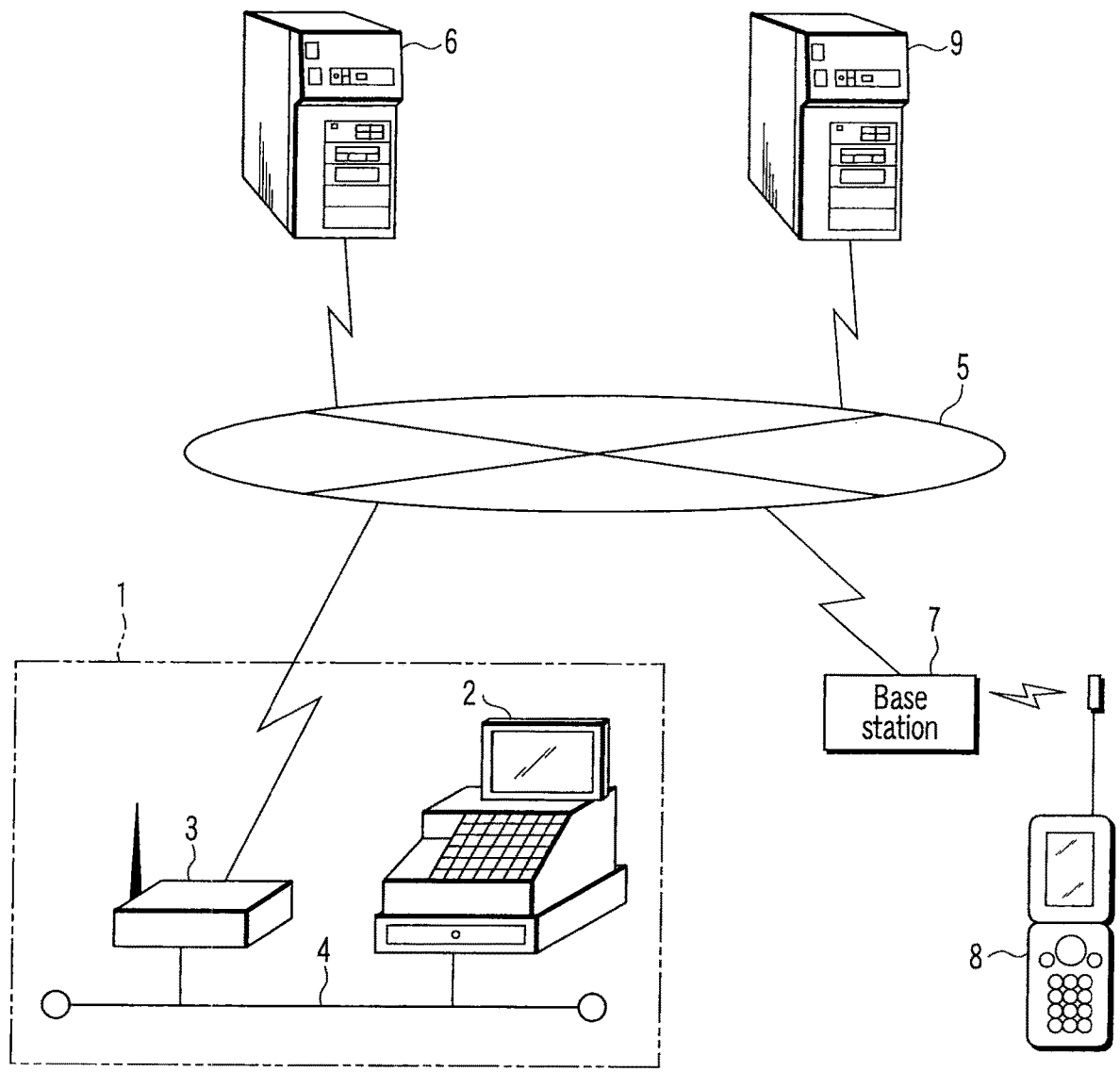
FIG. 1 is a diagram showing the overall configuration of a network system according to a first embodiment of the present invention.
Figure 2:
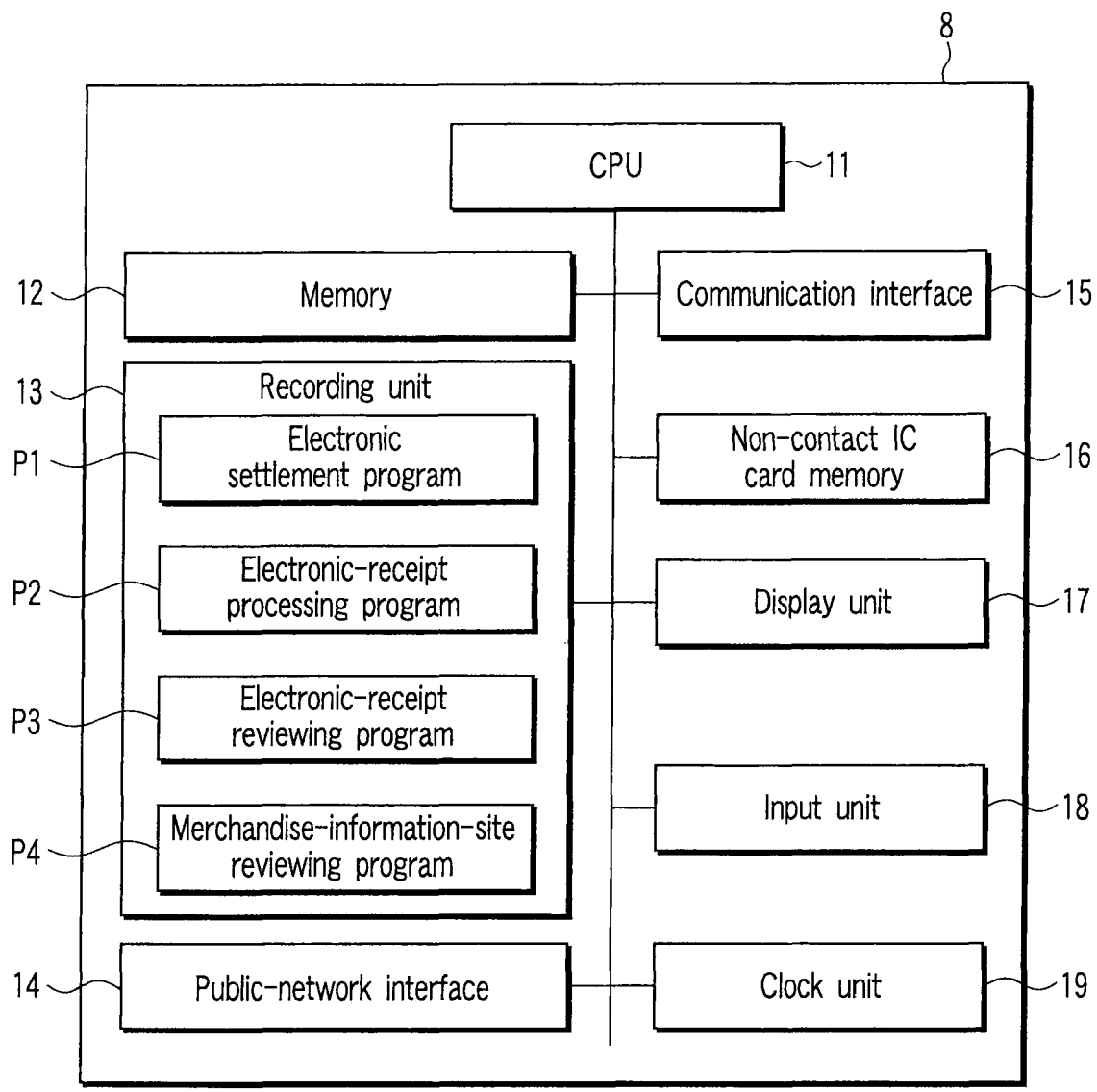
FIG. 2 is a block diagram showing the major components of a portable terminal included in the system according to the first embodiment.

FIG. 1 is a diagram showing the overall configuration of a network system according to the first embodiment. In a shop 1, a point-of-sales (POS) terminal 2 and a router 3 are provided. The POS terminal 2 and the router 3 connected by a local area network (LAN) 4 provided in the shop 1. In addition to the POS terminal 2, which is a settlement apparatus, there may be used other POS terminals in the shop 1. The router 3 connects the LAN 4 to the Internet 5.

To the Internet 5, which is a public communications network, an electronic-receipt server 6, a radio base station 7, and a merchandise-information providing server 9 are connected. The electronic-receipt server 6 operates as a Web server. The radio base station 7 can perform radio communication with a portable terminal 8, such as a cellular telephone, which incorporates a Web browser. The merchandise-information providing server 9 supplies necessary merchandise information to the portable terminal 8 via the Internet 5.

The components of the network system shown in FIG. 1 will be described in detail. First, the configuration of the portable terminal 8 will be described, with reference to the block diagram of FIG. 2.

The portable terminal 8 comprises a central processing unit (CPU) 11, a temporary memory 12, a recording unit 13, a public-network interface 14, a communications interface 15, a non-contact IC card memory 16, a display unit 17, an input unit 18, and a clock unit 19. The CPU 11 constitutes a control unit. The temporary memory 12 can temporarily store data. The recording unit 13 stores various programs and various items of data. The public-network interface 14 is used as first communications unit, and the communications interface 15 is used as second communications unit. The non-contact IC card memory 16 can store the information the communications interface 15 has received. The input unit 18 is the input device of the portable terminal 8. The clock unit 19 is a time-keeping device.

The public-network interface 14 is connected to a public network including the Internet 5 and performs communication with external apparatuses through the public network. The communications interface 15 accomplishes short-distance radio communication by using a non-contact IC card.

A Web browser is installed in the recording unit 13 so that the user of the portable terminal 8 may review the various information items (contents) published on Web. Further, the recording unit 13 stores an electronic settlement program P1, an electronic-receipt processing program P2, an electronic-receipt reviewing program P3, and a merchandise-information-site reviewing program P4. The electronic settlement program P1 enables the user to achieve electronic settlement on purchases. The electronic-receipt processing program P2 enables the user to receive electronic receipts issued after electronic settlement is made. The electronic-receipt reviewing program P3 enables the user to review any electronic receipt he or she has received. The merchandise-information-site reviewing program P4 enables the user to review the merchandise information supplied from the merchandise-information providing server 9.

Figures 3, 4:
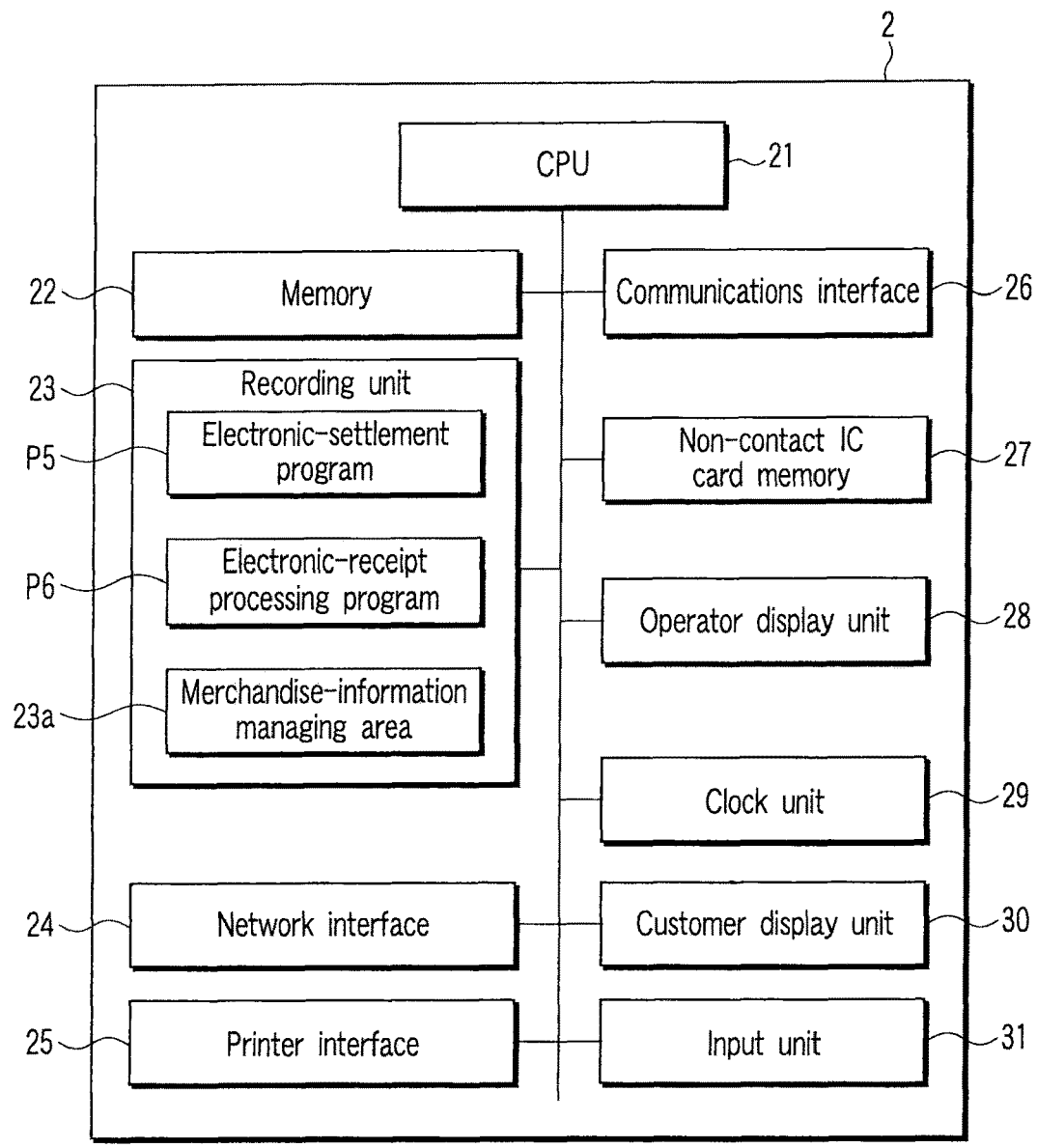
FIG. 3 is a block diagram showing the major components of a POS terminal included in the system according to the first embodiment.
FIG. 4 shows an example of the merchandise-information table recorded in the merchandise-information managing area of the POS terminal included in the system according to the first embodiment.

The major components of the POS terminal 2 will be described, with reference to FIG. 3.

The POS terminal 2 comprises a CPU 21, a temporary memory 22, a recording unit 23, a network interface 24, a printer interface 25, a communications interface 26, a non-contact IC card memory 27, an operator display unit 28, a clock unit 29, a customer display unit 30, and an input unit 31. The CPU 21 constitutes a control unit. The temporary memory 22 can temporarily store data. The recording unit 23 stores various programs and various items of data. The network interface 24 is used as first communications unit. To the printer interface 25, a printer is removably connected. The communications interface 26 is used as second communications unit. The non-contact IC card memory 27 can store the information the communications interface 26 has received. The operator display unit 28 can display various information items to the operator of the POS terminal 2. The clock unit 29 is a time-keeping device. The customer display unit 30 can display various information items to customers. The input unit 31 is the input device of the POS terminal 2.

The network interface 24 is connected to the LAN 4 and performs communication with some other components via the LAN 4. The communications interface 26 accomplishes short-distance radio communication by using a non-contact IC card.

The recording unit 23 stores software items that enable the POS terminal 2 to perform its functions. The unit 23 stores an electronic-settlement program P5 and an electronic-receipt processing program P6, too. The electronic-settlement program P5 enables the POS terminal 2 to perform electronic settlement. The electronic-receipt processing program P6 enables the POS terminal 2 to settle electronic receipts.

The recording unit 23 has a merchandise-information managing area 23a. The merchandise-information managing area 23a stores a merchandise-information table T1. The merchandise-information table T1 contains additional information about merchandise items. The additional information includes the names of the merchandise items, the prices thereof, and merchandise-information accessing data. The merchandise-information accessing data is used to link the POS terminal 2 to a site on the Internet 5, at which the merchandise information associated with this data can be acquired.

The information used to link the portable terminal 8 to any site the merchandise-information providing server 9 provides is the merchandise-information accessing data in the present embodiment. FIG. 4 shows an example of the merchandise-information table T1. This example contains a merchandise name, "wine 750 ml," the price of the merchandise, "9.81," and the merchandise-information accessing data, "http://awinecompany.co.jp/," which are stored in association.

Figure 5:
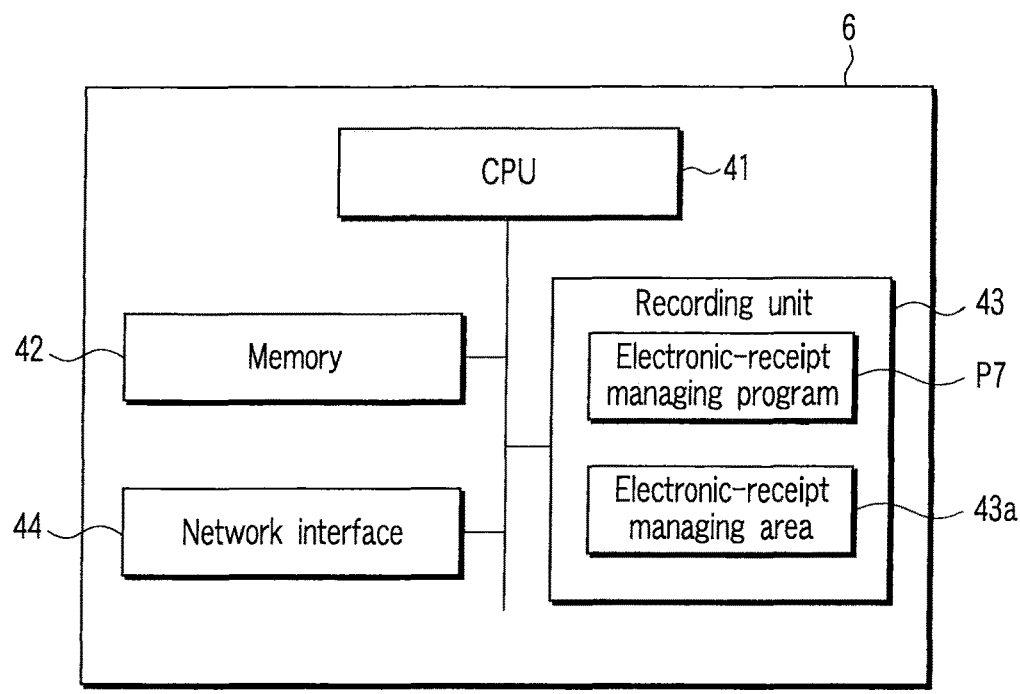
FIG. 5 is a block diagram showing the major components of an electronic-receipt server included in the system according to the first embodiment.

The major components of the electronic-receipt server 6 will be described with reference to the block diagram of FIG. 5. The electronic-receipt server 6 comprises a CPU 41, a temporary memory 42, a recording unit 43, and a network interface 44. The CPU 41 constitutes a control unit. The temporary memory 42 can temporarily store data. The recording unit 43 stores various programs and various items of data. The network interface 44 is connected to the Internet 5.

The recording unit 43 has an electronic-receipt managing area 43a. The area 43a can store electronic-receipt information so that this information may be published on Web. The recording unit 43 stores an electronic-receipt managing program P7, which enables the electronic-receipt server 6 to hold the electronic-receipt information received from the POS terminal 2, in the electronic-receipt managing area 43a.

Figure 6:
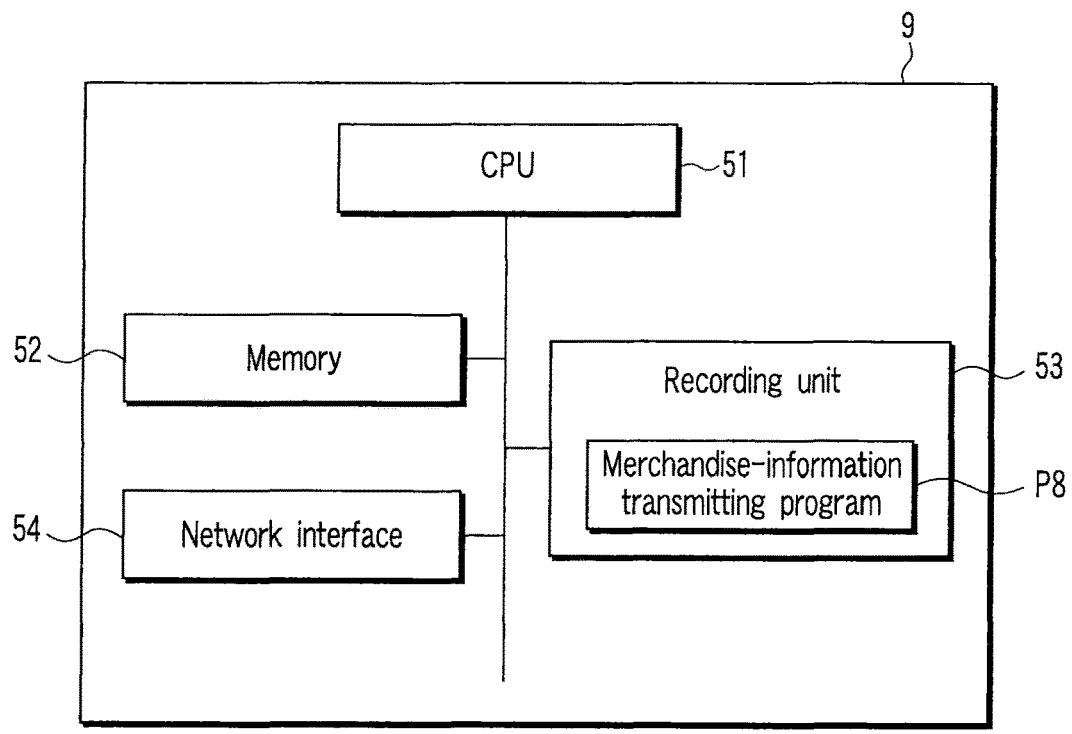
FIG. 6 is a block diagram showing the major components of a merchandise-information providing server included in the system according to the first embodiment.

The configuration of the merchandise-information providing server 9 will be described, with reference to the block diagram of FIG. 6. The merchandise-information providing server 9 comprises a CPU 51, a temporary memory 52, a recording unit 53, and a network interface 54. The CPU 51 constitutes a control unit. The temporary memory 52 can temporarily store data. The recording unit 53 stores various programs and various items of data. The network interface 54 can be connected to the Internet 5.

The recording unit 53 stores a merchandise-information transmitting program P8, which enables the server 9 to transmit the information about any merchandise to the portable terminal 8.

Figure 7:
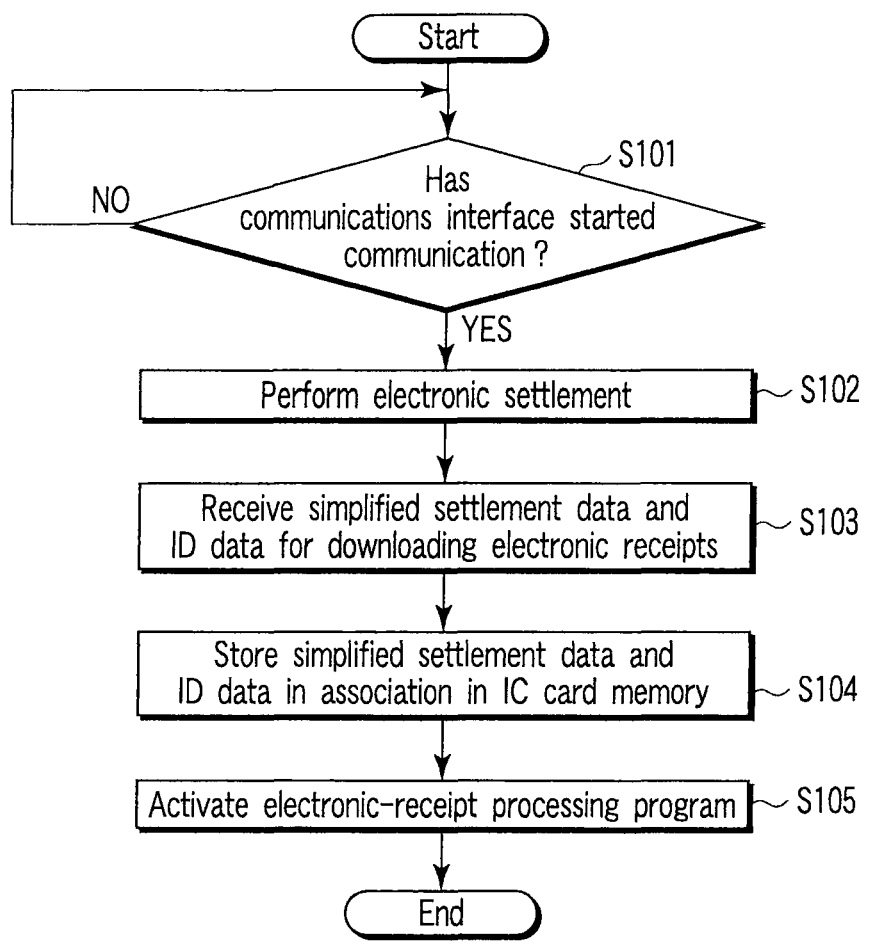
FIG. 7 is a flowchart explaining the sequence of major steps described in the electronic settlement program installed in the portable terminal included in the system according to the first embodiment.
Figure 8:
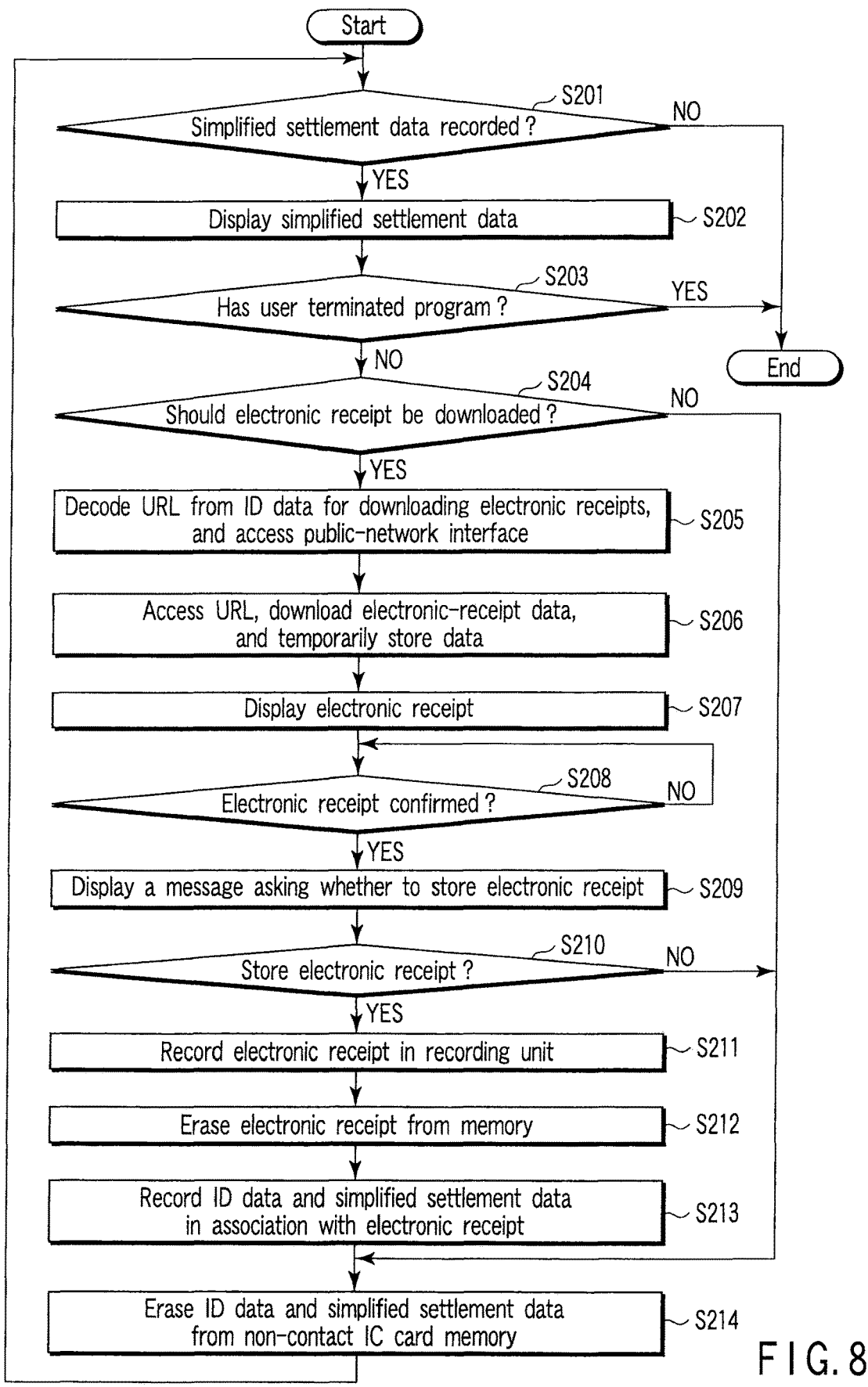
FIG. 8 is a flowchart that explains the sequence of major steps described in the electronic receipt program installed in the portable terminal included in the system according to the first embodiment.
Figure 9:
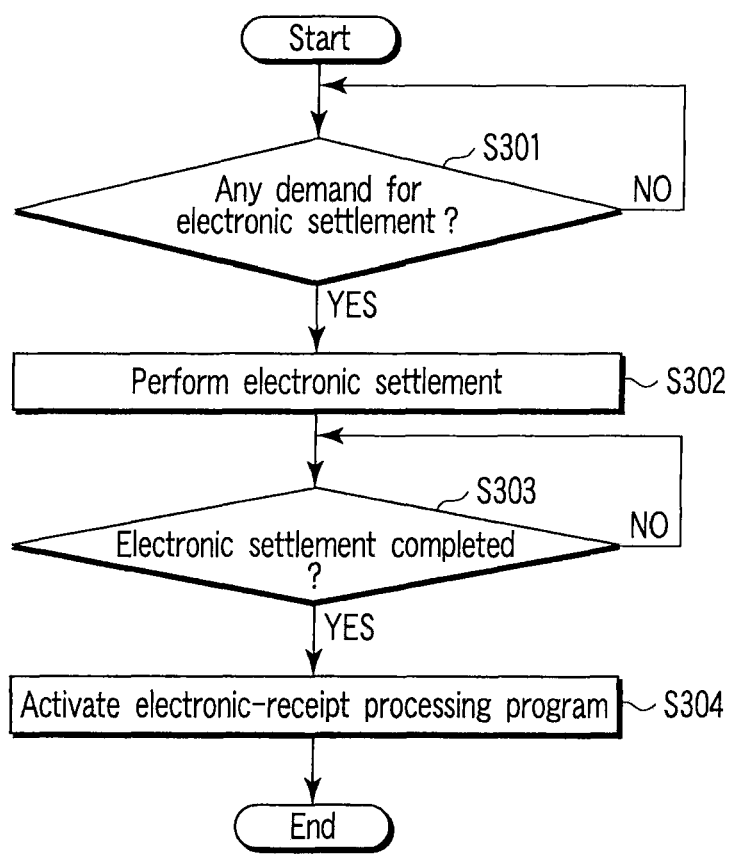
FIG. 9 is a flowchart that explains the sequence of major steps described in the electronic-settlement processing program installed in the POS terminal according to the first embodiment.
Figure 10:
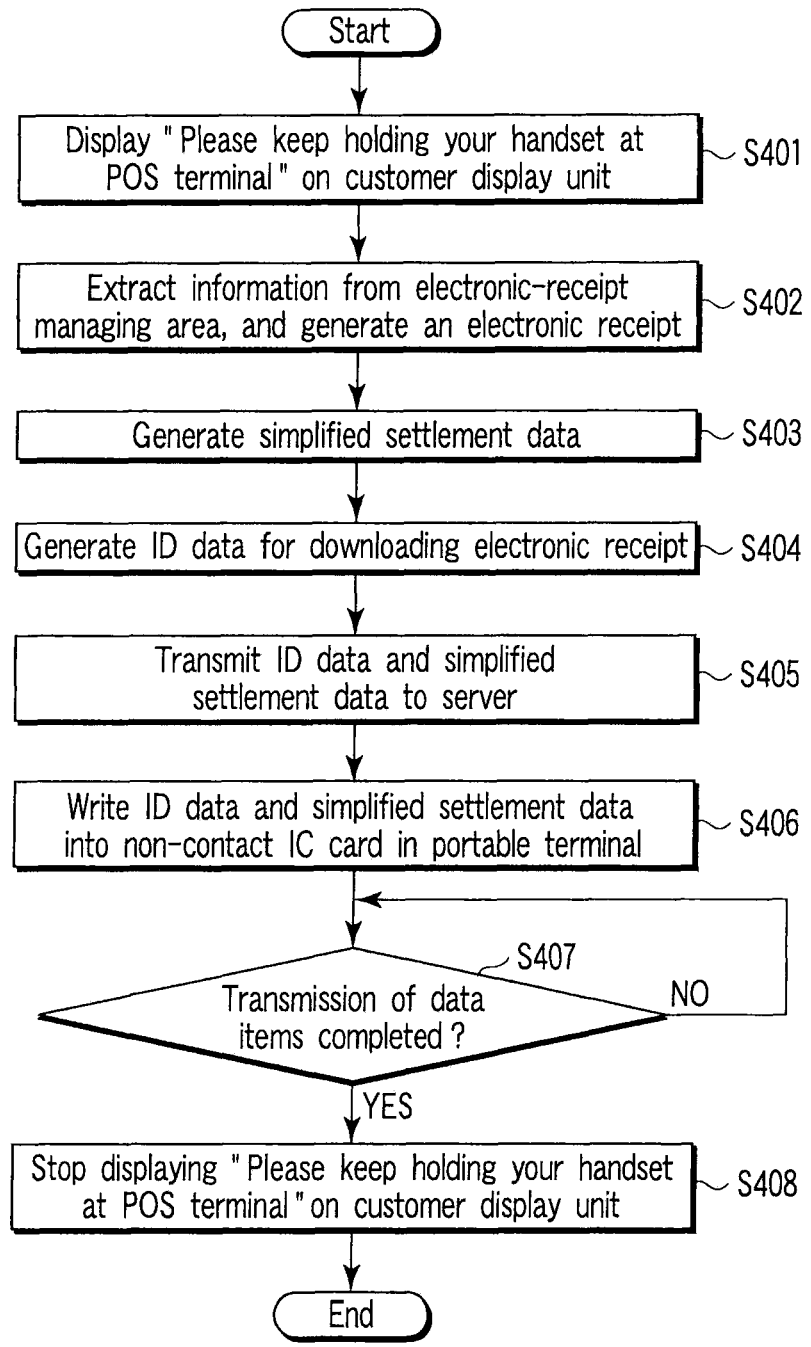
FIG. 10 is a flowchart that explains the sequence of major steps described in the electronic-receipt processing program installed in the POS terminal included in the system according to the first embodiment.

FIG. 7 is a flowchart that explains the sequence of major steps described in the electronic settlement program P1 that is installed in the portable terminal 8. FIG. 8 is a flowchart that explains the sequence of major steps described in the electronic-receipt processing program P2 that is installed in the portable terminal 8. FIG. 9 is a flowchart that explains the sequence of major steps described in the electronic-settlement program P5 that is installed in the POS terminal 2. FIG. 10 is a flowchart that explains the sequence of major steps described in the electronic-receipt processing program P6 that is installed in the POS terminal 2.

How the portable terminal 8 performs electronic settlement will be explained with reference to FIG. 7.

To make electronic settlement, the purchaser operates the input unit 18 provided on his or her portable terminal 8, activating the electronic settlement program P1. On the other hand, the cashier operates the POS terminal 2, registering the sales data concerning the merchandise the customer (i.e., purchaser) has bought, into the POS terminal 2. On registering the sales data, the cashier asks the purchaser to pay for the merchandise. So requested, the purchaser moves the portable terminal 8 toward the POS terminal 2, setting the communications interface 15 at a position close to the communications interface 26 of the POS terminal 2.

Since the electronic settlement program P1 has been activated, the CPU 11 of the portable terminal 8 monitors the communications interface 15 (Step S101). When the portable terminal 8 is moved near the POS terminal 2, the communications interface 15 starts communication with the communications interface 26 of the POS terminal 2. At this point, the CPU 11 sends a request for electronic settlement to the POS terminal 2 via the communications interface 15 (Step S102).

In response to this request, the POS terminal 2 performs electronic settlement with the portable terminal 8. When the electronic settlement is completed, the POS terminal 2 generates ID data for downloading electronic-receipt data from an electronic-receipt server 6 and simplified settlement data. The ID data and the simplified settlement data are transmitted from the communications interface 26 to the portable terminal 8. The ID data is information that is used to download the electronic receipt that has been uploaded from POS terminal 2 into the electronic-receipt server 6. The simplified settlement data is data extracted from the settlement data that is recorded on the electronic receipt.

In the portable terminal 8, the CPU 11 receives, via the communication interface 15, the ID data for downloading electronic-receipt data from an electronic-receipt server 6 and simplified settlement data transmitted from the POS terminal 2 (Step S103). The CPU 11 associates the ID data and the simplified settlement data with each other and then stores them into the non-contact IC card memory 27 (Step S104). Thereafter, the CPU 11 activates the electronic settlement program P2 (Step S105).

How the portable terminal 8 operates after the electronic-receipt processing program P2 has been activated will be explained, with reference to FIG. 8.

In the portable terminal 8 with the electronic-receipt processing program P2 activated, the CPU 11 determines whether the non-contact IC card memory 16 stores simplified settlement data (Step S201). If the memory 16 stores the simplified settlement data, the CPU 11 makes the display unit 17 display the simplified settlement data (Step S202).

Next, the CPU 11 causes the display unit 17 to display a message asking the user whether the program P2 should be terminated and waits for an input from the user (Step S203). If the user inputs a command for terminating the program P2, the CPU 11 terminates the electronic-receipt processing program P2.

If the user inputs a command for keeping the activation of the program P2, the CPU 11 makes the display unit 17 display a message asking the user whether the electronic receipt corresponding to the simplified settlement data should be downloaded and then waits for an input from the user (Step S204).

If the user inputs a command for downloading the electronic receipt, the CPU 11 decodes the ID data stored in association with the simplified settlement data, thereby generating an URL that will be used to download the electronic receipt. Using the URL thus generated, the CPU 11 connects the public-network interface 14 to the Internet 5 (Step S205).

The URL represents the address of the electronic-receipt managing area 43a provided in the electronic-receipt server 6, in which the electronic-receipt information has been uploaded from the POS terminal 2. The CPU 11 downloads the electronic-receipt information from the address (Step S206). The information thus downloaded is temporarily stored in the memory 12.

The CPU 11 analyzes the electronic-receipt information thus downloaded and makes the display unit 17 display the electronic receipt represented by this information (Step S207). The CPU 11 then waits for a confirmation from the user (Step S208).

When the user input a confirmation, the CPU 11 makes the display unit 17 display a message asking the user whether the electronic receipt should be stored in the portable terminal 8 (Step S209) and waits for an input from the user (Step S210). Upon receiving of the user input indicating that electronic receipt should be stored, the CPU records the electronic-receipt information in the recording unit 13 (Step S211). The CPU 11 then erases the electronic-receipt information from the temporary memory 12 (Step S212).

Next, the CPU 11 records the ID data and the simplified settlement data, both used to download the electronic receipt, in the recording unit 13 in association with the electronic-receipt information (Step S213). Alternatively, only the simplified settlement data may be recorded in association with the electronic-receipt information.

Thereafter, the CPU 11 erases the ID data and the simplified settlement data, both used to download the electronic receipt, from the non-contact IC card memory 16 (Step S214). The operation then returns to the first step.

How the POS terminal 2 operates after the electronic-receipt processing program P5 has been activated will be explained, with reference to FIG. 9. In the POS terminal 2, the electronic-settlement program P5 is activated when the information about the merchandise the customer (i.e., user of the portable terminal 8) has bought.

In the POS terminal 2 with the electronic-settlement program P5 activated, the CPU 21 waits for a request for electronic settlement coming from the portable terminal 8 via the communications interface 26 (Step S301). A request for electronic settlement may come after the information concerning the merchandise has been registered. In this case, the CPU 21 performs the electronic settlement on the basis of the information concerning the merchandise (Step S302). Thus, the electronic settlement between the POS terminal 2 and the portable terminal 8 is completed (Step S303). Then, the CPU 21 activates the electronic-receipt processing program P6.

How the POS terminal 2, in which the electronic-receipt processing program P6 has been activated, operates will be explained, with reference to FIG. 10.

In the POS terminal 2 with the electronic-receipt processing program P6 activated, the CPU 21 makes the customer display unit 30 display a message of, for example, "Please keep holding your portable terminal at the POS terminal 2" (Step S401). There is a time lag between the completion of the electronic settlement and the transmission of simplified settlement data to the portable terminal 8. Therefore, the ID data and the simplified settlement data, which is required to downloading the electronic receipt, cannot be transmitted if the user moves the portable terminal 8 away from the communications interface 26 of the POS terminal 2 immediately after the electronic settlement is accomplished. If these data items are not transmitted, the electronic receipt will not be transmitted to the electronic-receipt server 6. This is why the customer display unit 30 displays the message, telling the user not to move the portable terminal 8 away from the POS terminal 2.

While the display unit 30 is displaying the message, the CPU 21 performs a process for generating an electronic receipt and information items related to the receipt. More precisely, the CPU 21 extracts, from the merchandise-information managing area 23a, the name and price of the merchandise registered at the electronic settlement, the merchandise-information accessing data and the like which should be recorded on the electronic receipt. Using these information items, the CPU 21 generates the electronic receipt (Step S402). Further, the CPU 21 extracts the data items, such as the date of settlement and the total amount paid for the merchandise, from the information items recorded on the electronic receipt, and generates simplified settlement data from the data items extracted (Step S403). Furthermore, the CPU 21 generates ID data which will be later used to download the electronic receipt from the electronic-receipt server 6 to the portable terminal 8 (Step S404).

At this point, the data on the electronic receipt and the simplified settlement data are formulated in such as Extensible Markup Language (XML) format as is shown in FIGS.

12 and 13. On the electronic receipt, the merchandise-information accessing data is recorded as href="http:// . . . " in tag <merchandise> contained in the XML data (FIG. 12).

The CPU 21 connects the network interface 24 to the LAN and the Internet 5. The ID data for downloading the electronic receipt and the electronic-receipt information, thus generated, are transmitted from the POS terminal 2 to the electronic-receipt server 6 (Step S405). The CPU 21 further transmits the ID data for downloading the electronic receipt and the simplified settlement data to the portable terminal 8 via the communications interface 26 (Step S406).

On completing transmission of the ID data and the simplified settlement data to the portable terminal 8 (Step S407), the CPU 21 causes the display unit 30 to stop displaying the message (Step S408). The process of the electronic-receipt processing program P6 is thus completed.

Figure 11:
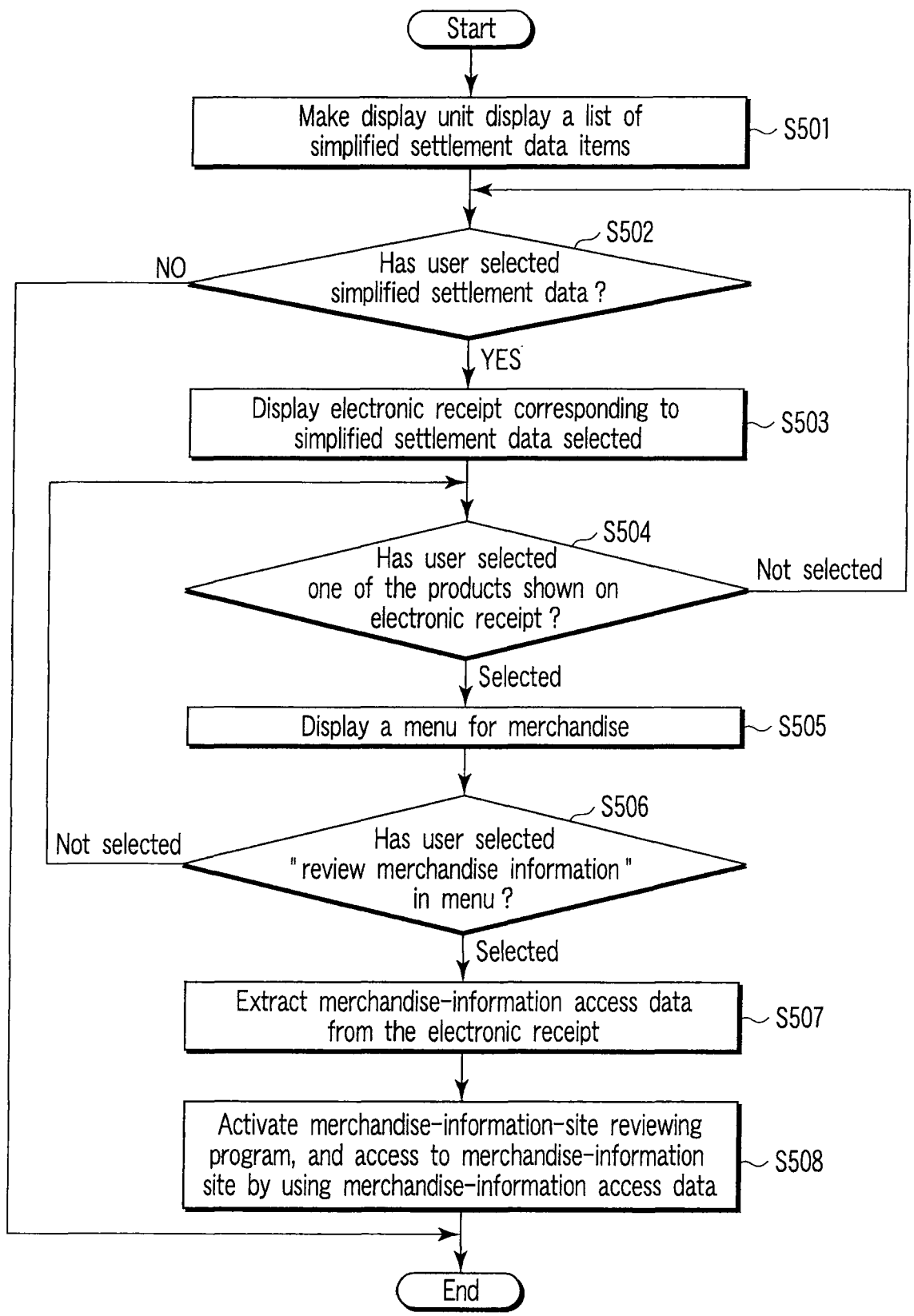
FIG. 11 is a flowchart that explains the sequence of the major steps of the electronic-receipt reviewing program installed in the portable terminal according to the first embodiment.

How the user accesses the merchandise information on the electronic receipt when he or she reviews the electronic receipt displayed on the portable terminal 8 will be explained, with reference to FIG. 11 is a flowchart the sequence of major steps of the electronic-receipt reviewing program P3 installed in the portable terminal 8.

The user operates the input unit 18 provided on his or her portable terminal 8, thereby activating the electronic-receipt reviewing program P3.

In the portable terminal 8 with the electronic-receipt reviewing program P3 thus activated, the CPU 11 makes the display unit 17 to display a list of the simplified settlement data items concerning all electronic receipts stored in the recording unit 13 (Step S501). The CPU 11 then prompts the user to select at least one of the simplified settlement data items.

FIG. 14 shows some of the simplified settlement data items displayed on the display unit 17 at this point. As seen from FIG. 14, the data items are displayed in the form of a list. The user operates the input unit 18, thus moving the cursor to any desired data item, on the screen of the display unit 17. The desired data item is thereby selected.

The CPU 11 determines whether the user has selected any simplified settlement data item (Step S502). If the user has selected a simplified settlement data item, the CPU 11 analyzes the XML data on the electronic receipt, which corresponds to the simplified settlement data selected and then makes the display unit 17 display the electronic receipt (Step S503).

Figure 15:
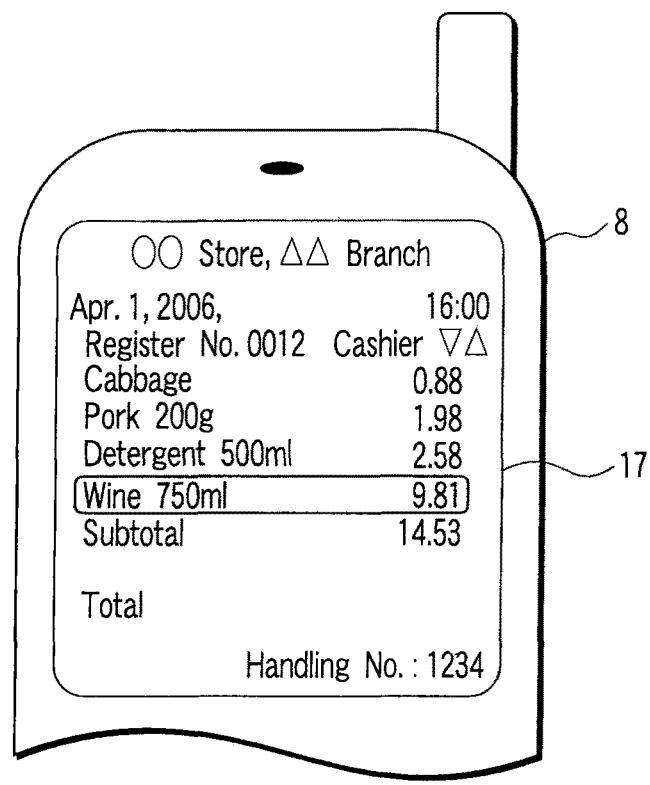
FIG. 15 is a diagram showing an example of information, displayed by the display unit of the portable terminal included in the system according to the first embodiment.

FIG. 15 shows the data the display unit 17 displays at this time. As seen from FIG. 15, the electronic receipt is displayed in the same layout as the corresponding paper receipt. The user can select any merchandise displayed on the display unit 17, by operating the input unit 18 and moving the cursor to the name of the merchandise displayed on the display unit 17.

The CPU 11 determines whether the user has selected any one of item of the merchandise recorded on the electronic receipt (Step S504). If any one item of merchandise has been selected, the CPU 11 makes the display unit 17 display the menu about the merchandise selected (Step S505). If the input is not concerned with selection of merchandise, the operation returns to Step S502.

After making the display unit 17 display the menu about the merchandise, the CPU 11 determines whether the user has selected "review merchandise information," i.e., one of the menu items (Step S506). If "review merchandise information" has been selected, the CPU 11 extracts, from the data recorded on the electronic receipt, merchandise-information access data about the merchandise the user has selected (http://awinecompany.co.jp/ for wine) (Step S507).

Thereafter, the CPU 11 activates the merchandise-information-site reviewing program P4. Using the merchandise-information accessing data, the CPU 11 accesses the merchandise-information site (i.e., the merchandise-information providing server 9) through the Internet 5 (Step S508).

If any item other than "review merchandise information" has been selected, the operation returns to Step S504.

Figure 16:
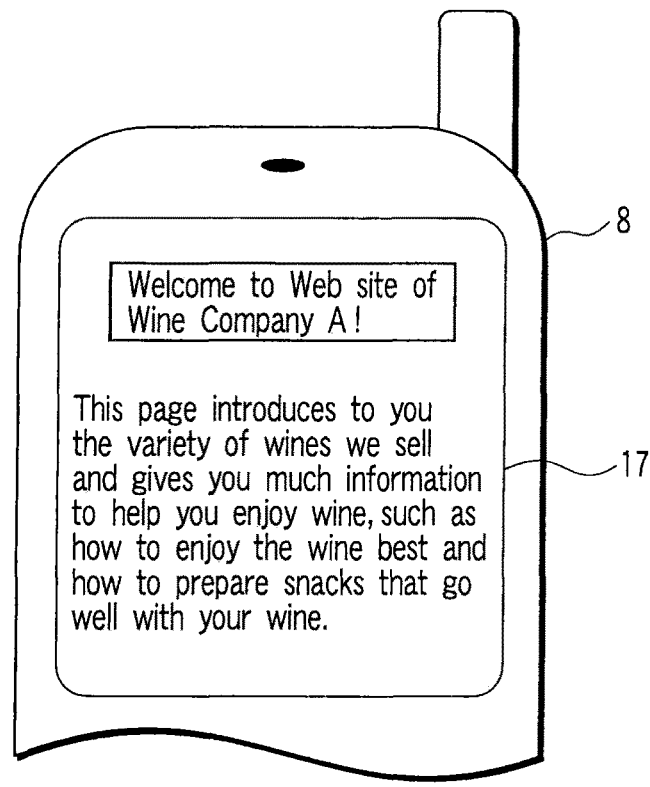
FIG. 16 is a diagram showing another example of data displayed by the display unit of the portable terminal according to the first embodiment.

The merchandise-information providing server 9 keeps activating the merchandise-information transmitting program P8 at all times and keeps waiting for an access from the portable terminal 8. In the merchandise-information providing server 9, the CPU 51 receives an access from the portable terminal 8. It then transmits the Web page of the merchandise information contained in the URL of the access, to the portable terminal 8. At this time the display unit 17 of the portable terminal 8 displays such data as shown in FIG. 16. This operation is the same as one performed in the ordinary Web server, and will not de described here in detail.

In the network system of the configuration described above, the POS terminal 2 generates an electronic receipt showing the details of an electronic settlement when the POS terminal 2 at the transaction is settled with the customer at the shop 1. The electronic receipt thus generated is transmitted via the Internet 5 to the electronic-receipt server 6 and is published on Web.

At this time, the simplified settlement data based on the settlement data and the ID data for downloading the electronic receipt are transmitted from the POS terminal 2 to the portable terminal 8. When the customer operates the portable terminal 8, demanding that electronic receipt be downloaded, the electronic-receipt information is downloaded from the electronic-receipt server 6 into the portable terminal 8 in accordance with the ID data.

Thus, the customer can have the electronic receipt published on Web downloaded into the portable terminal 8 that incorporates a Web browser. He or she can therefore easily review the electronic receipt on the Web browser in the open, without necessity of going home and using the personal computer or the like at home.

The portable terminal 8 can access the merchandise-information providing server 9, by using the electronic receipt downloaded from the electronic-receipt server 6. The portable terminal 8 can then make the display unit 17 display the Web page about the merchandise, transmitted from the merchandise-information providing server 9.

Hence, the user can easily review the merchandise information in the Web page displayed on the display unit 17 of the portable terminal 8. This easy access to the information about the merchandise bought is very useful for the user, and also to the shops because the merchandise information helps to promote the sales.

Second Embodiment

The second embodiment of the invention will be described with reference to FIGS. 17 to 27. The components identical to those of the first embodiment are designated by the same reference numerals and will not be described in detail.

Figure 17:
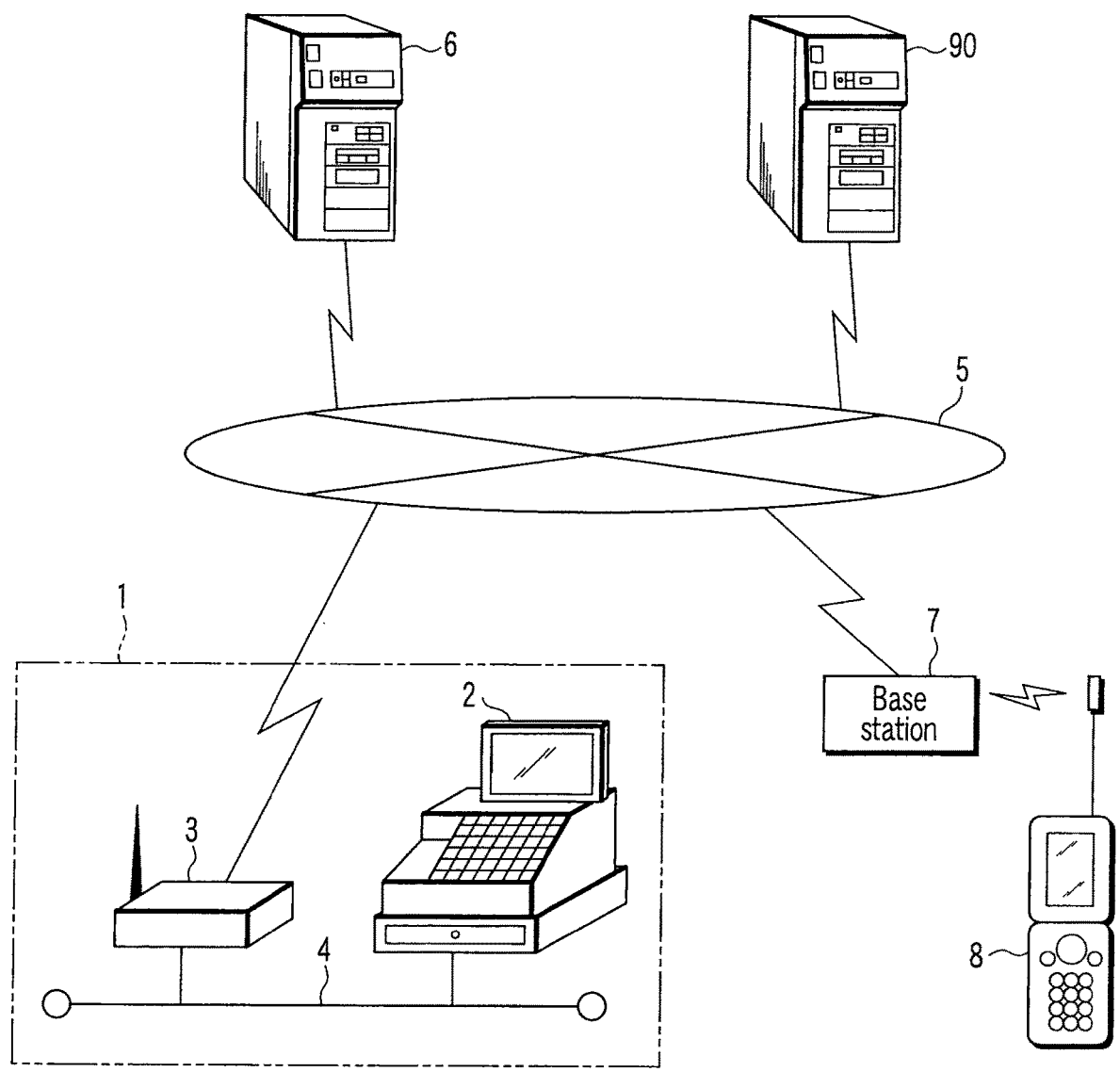
FIG. 17 is a diagram showing the overall configuration of a network system according to a second embodiment of the present invention.

FIG. 17 is a diagram showing the overall configuration of a network system according to the second embodiment. The second embodiment differs from the first embodiment in that a merchandise-purchase server 90 is connected to the Internet 5, instead of the merchandise-information providing server 9.

Figures 18, 19:
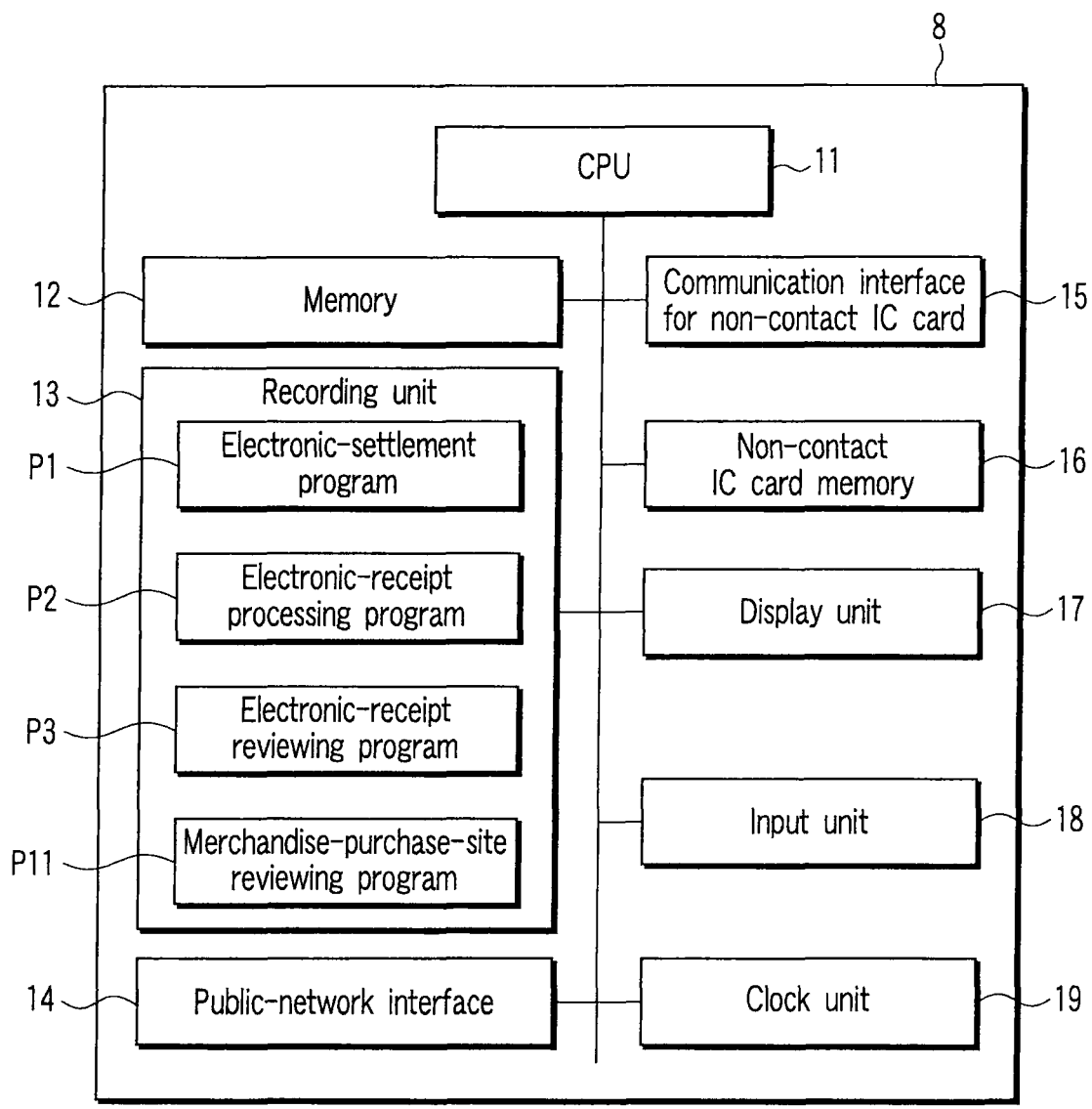
FIG. 18 is a block diagram showing the major components of a portable terminal included in the system according to the second embodiment.
FIG. 19 shows an example of the merchandise-information table recorded in the merchandise-information managing area of a POS terminal included in the system according to the second embodiment.

FIG. 18 is a block diagram showing the major components of the portable terminal 8 included in the system according to the second embodiment. In the second embodiment, a merchandise-purchase-site reviewing program P11 is installed in the recording unit 13 of the portable terminal 8. The merchandise-purchase-site reviewing program P11 is enable the user of the portable terminal 18 to review the merchandise information provided from the merchandise-purchase server 90 and to place orders for any merchandise he or she wants, by operating the portable terminal 8.

FIG. 19 shows an example of the merchandise-information table T1 recorded in the merchandise-information managing area 23a of the POS terminal 2. As shown in FIG. 19, a purchase-site ID is stored as additional information about merchandise in the merchandise-information table T1, instead of the merchandise-information accessing data. The purchase-site ID is used to link the portable terminal 8 to a site on the Internet 5 so that the user may buy the merchandise corresponding to the ID.

In the second embodiment, the purchase-side ID is the data that links the portable terminal 8 to a site that the merchandise-providing server 90 provides. In the case shown in FIG. 19, purchase-site ID "0512843" is recorded for merchandise name "wine 750 ml; price 9.81".

Figures 20, 21:
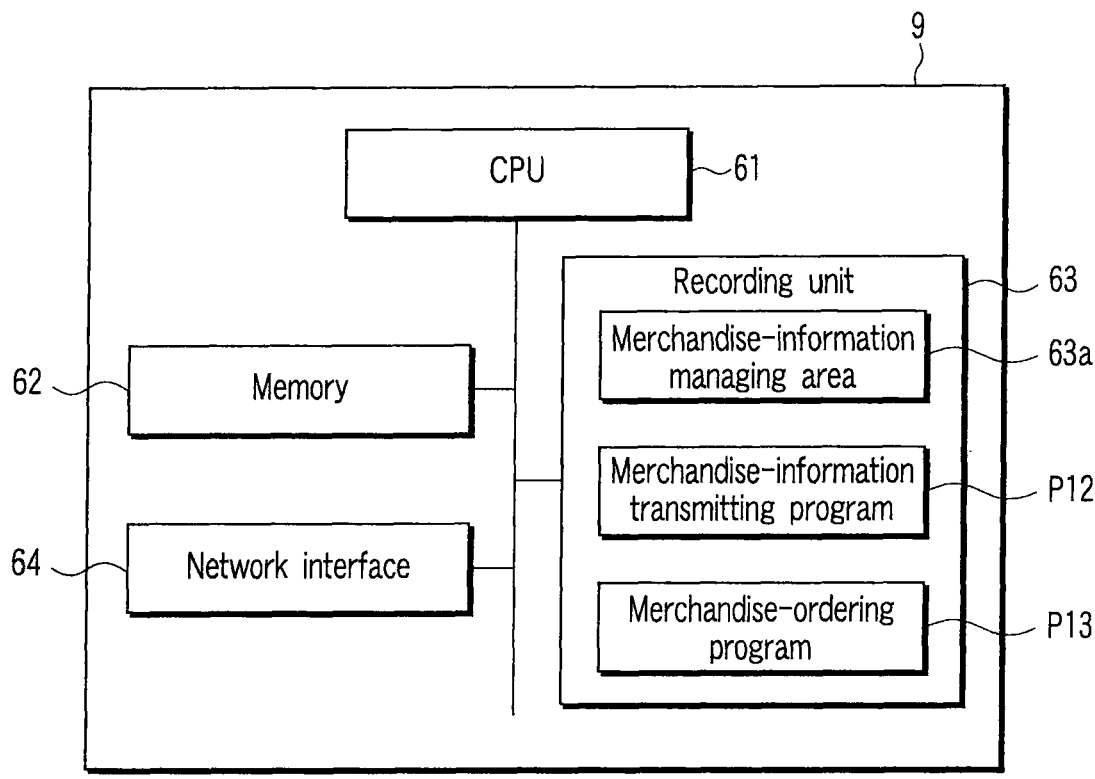
FIG. 20 is a block diagram showing the major components of the merchandise-purchase server included in the system according to the second embodiment.
FIG. 21 is a diagram showing an example of the table recorded in the merchandise-information managing area of a merchandise-purchase server included in the system according to the second embodiment.

FIG. 20 is a block diagram showing the major components of the merchandise-purchase server 90 included in the system according to the second embodiment. The merchandise-purchase server 90 comprises a CPU 61, a temporary memory 62, a recording unit 63, and a network interface 64. The CPU 61 constitutes a control unit. The temporary memory 62 can temporarily store data. The recording unit 63 stores various programs and various items of data. The network interface 64 can be connected to the Internet 5.

The recording unit 63 has a merchandise-information managing area 63a where merchandize information is recorded, which is related to the merchandise items that are sold at the site. In the merchandise-information managing area 63a, a merchandise-information transmitting program P12 and a merchandise-ordering program P13 are installed. The merchandise-information transmitting program P12 is used to transmit the merchandise information about any specific merchandise to the portable terminal 8. The merchandise-ordering program P13 is used to order any merchandise the user has ordered or the merchandise related to the merchandise the user has ordered.

FIG. 21 shows an example of the table T3 recorded in the merchandise-information managing area 63a. As FIG. 21 shows, merchandise name "wine 750 ml" is recorded in the table T3, for the purchase-site ID "0512843." Further, five items of information about merchandise related to this merchandise, i.e., "corkscrew," "label-removing set," "wine X 750 ml," "wine Y 750 ml," and "wine Z 750 ml," are recorded in the in the table T3.

Dates are set, at which the related merchandise should preferably be purchased. In the present embodiment, the dates are set in accordance with the date at which the merchandise is most likely consumed. More specifically, the purchase date for "corkscrew" is set as "0 days later," i.e., the same data as the merchandise "wine 750 ml" is purchases. The purchase date for "label-removing set" is set as "three days later," because the wine is expected to be consumed three days after the wine is purchased. Similarly, the purchase dates for "wine X 750 ml," "wine Y 750 ml," and "wind Z, 750 ml" are set as "three days later," "15 days later," and "30 days later," respectively, when "wine 750 ml," "wine X 750 ml" and "wine Y 750 ml" are expected to be consumed. That is, when the user accesses to the information about specific merchandise, it is recommended that the merchandise related to the merchandise should be purchased at particular dates after the user has bought the merchandise.

Figure 22:
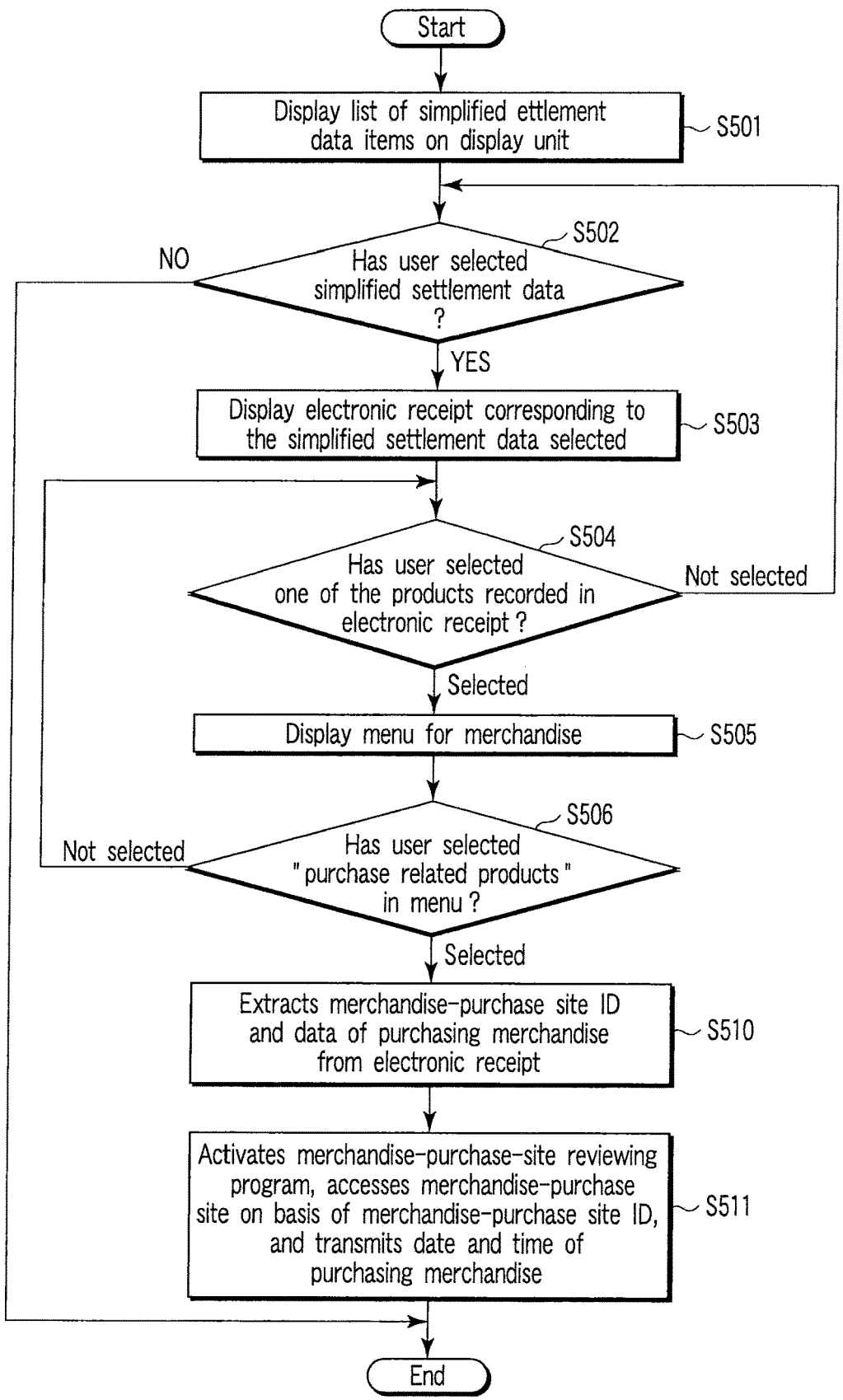
FIG. 22 is a flowchart that explains the sequence of the major steps of the electronic-receipt reviewing program installed in the portable terminal included in the system according to the second embodiment.
Figure 23:
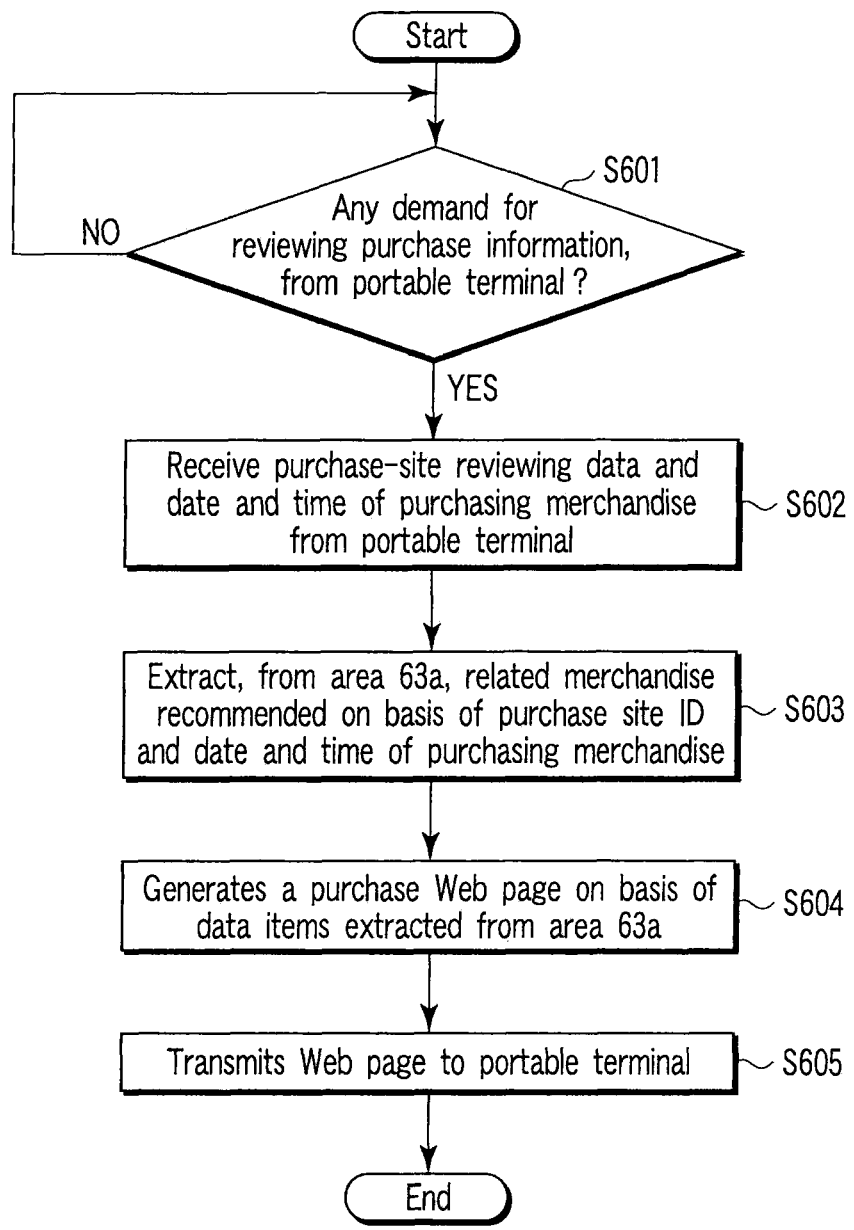
FIG. 23 is a flowchart that explains the sequence of the major steps of the merchandise-information transmitting program installed in the merchandise purchase server according to the second embodiment.
Figure 24:
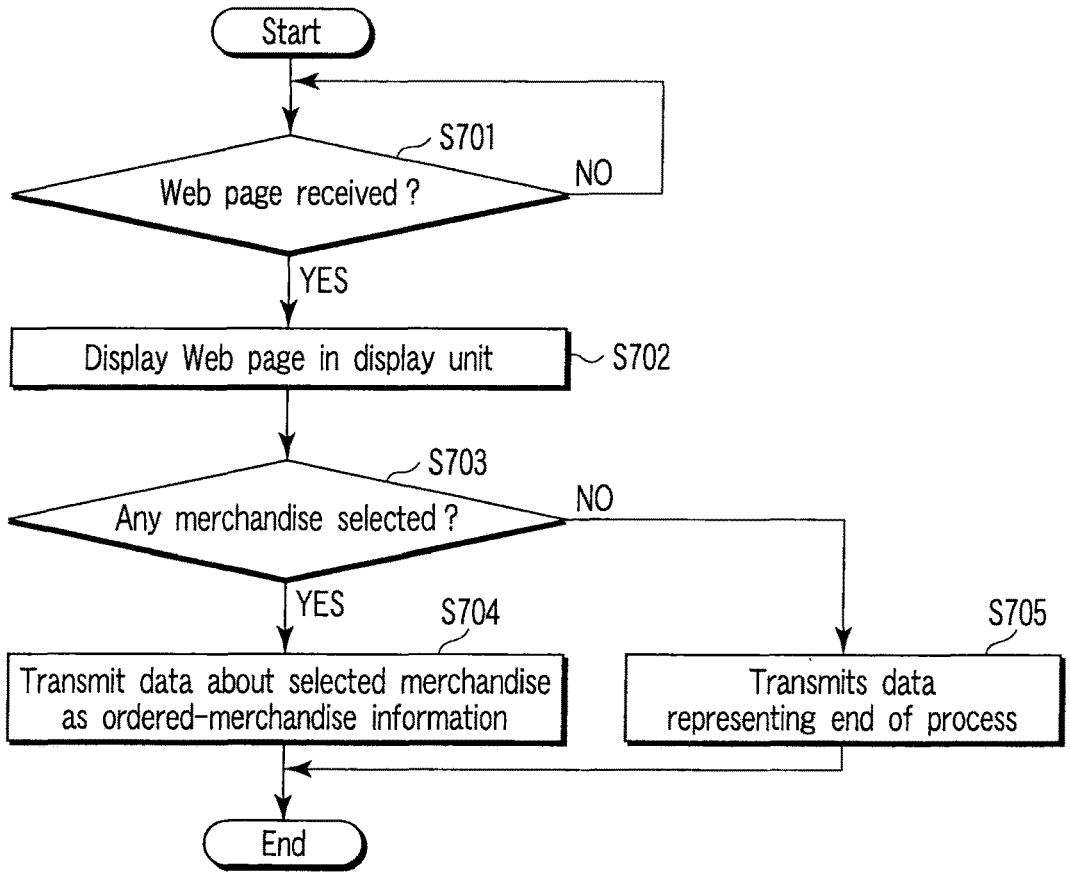
FIG. 24 is a flowchart that explains the sequence of the major steps of the merchandise-purchase-site reviewing program installed in the portable terminal included in the system according to the second embodiment.
Figure 25:
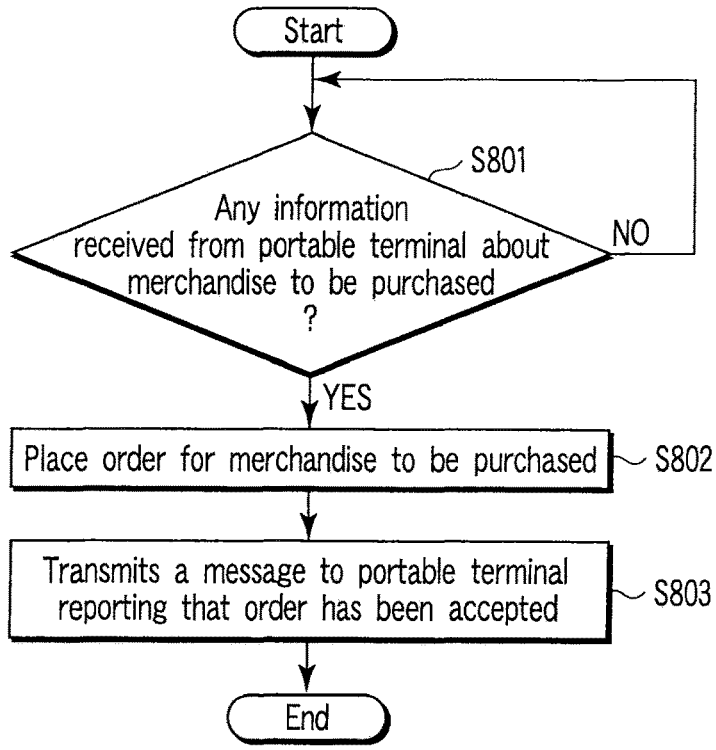
FIG. 25 is a flowchart that explains the sequence of the major steps of the merchandise-ordering program installed in the merchandise purchase server included in the system according to the second embodiment.
Figure 26:
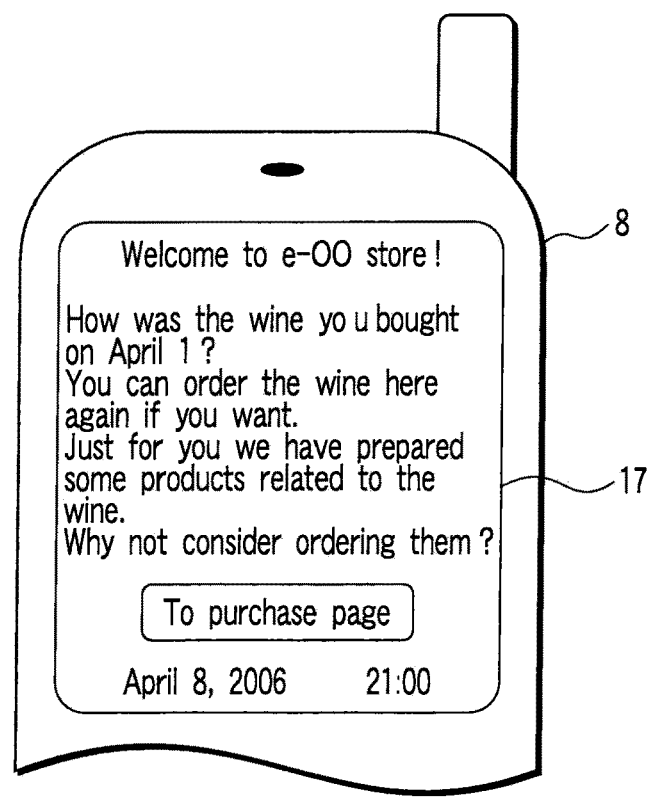
FIG. 26 is a diagram showing an example of information, displayed by the display unit of the portable terminal included in the system according to the second embodiment.

FIG. 22 is a flowchart that explains the sequence of the major steps of the electronic-receipt reviewing program P3 installed in the portable terminal 8. FIG. 23 is a flowchart that explains the sequence of the major steps of the merchandise-information transmitting program P12 installed in the merchandise-purchase server 90. FIG. 24 is a flowchart that explains the sequence of the major steps of the merchandise-purchase-site reviewing program P11 installed in the portable terminal 8. FIG. 25 is a flowchart that explains the sequence of the major steps of the merchandise-ordering program P13 installed in the merchandise purchase server 90.

The electronic settlement program P1 and electronic-receipt processing program P2 installed in the portable terminal 8 and the electronic-settlement program P5 and electronic-receipt processing program P6 installed in the POS terminal 2 are identical in the sequence of major steps to those used in the first embodiment. Therefore, they will not be explained here in detail.

How the user accesses the merchandise information recorded on an electronic receipt by reviewing the electronic receipt on the portable terminal 8 will be explained, with reference to FIG. 22.

The user operates the input unit 18 provided on his or her portable terminal 8, activating the electronic-receipt reviewing program P3.

Since the electronic-receipt reviewing program P3 has been activated, the CPU 11 of the portable terminal 8 makes the display unit 17 display a list of all simplified settlement data items about the electronic receipts thus far received and recorded in the recording unit 13 (Step S501). The CPU 11 then prompts the user to select at least one of the simplified settlement data items.

The CPU 11 determines whether the user has selected any simplified settlement data item (Step S502). If the user has selected a simplified settlement data item, the CPU 11 makes the display unit 17 displays the electronic receipt corresponding to the simplified settlement data selected (Step S503).

The CPU 11 then determines whether one of the items of merchandise recorded on the electronic receipt has been selected (Step S504). If any one of the items of merchandise has been selected, the CPU 11 makes the display unit 17 display the menu about the merchandise selected (Step S505). If the input is not concerned with selection of merchandise, the operation returns to Step S502.

After making the display unit 17 display the menu about the merchandise, the CPU 11 determines whether the user has selected "purchase related products," i.e., one of the menu items (Step S506). If "purchase related products" has been selected, the CPU 11 extracts, from the data recorded on the electronic receipt, merchandise-purchase site ID and the date of purchasing the merchandise (Step S510). At this point, the place where the merchandise has been bought may be extracted, too.

Thereafter, the CPU 11 activates the merchandise-purchase-site reviewing program P11, accesses the merchandise-purchase site (i.e., merchandise purchase server 90) via the Internet 5 on the basis of the merchandise-purchase site ID, and transmits the date and time of purchasing the merchandise (Step S511). At the same time the date and time of purchasing the merchandise is transmitted, the data representing the site may be transmitted, too.

If any item other than "review merchandise information" is selected in the menu, the operation returns to Step S504.

The sequence of the major steps of the operation that the merchandise purchase server 90 performs when the user operates the portable terminal 8, thereby accessing the merchandise-purchase site, will be explained, with reference to FIG. 23.

The merchandise purchase server 90 keeps activating the merchandise-information transmitting program P12 and keeps waiting for an access from the portable terminal 8 (Step S601). In the merchandise purchase server 90, the CPU 61 receives the purchase-site reviewing data and the date and time of purchasing the merchandise from the portable terminal 8 when the portable terminal 8 makes a demand for reviewing the purchase information (Step S602).

Next, the CPU 61 extracts, from the merchandise-information managing area 63a of the recording unit 63, related merchandise recommended on the basis of the merchandise-purchase site ID contained in the purchase-site reviewing data and the date and time of purchasing the merchandise (Step S603). Assume the user of the portable terminal 8 has bought wine and accesses the merchandise purchase server 90 four days later. In this case, the CPU extracts "corkscrew," "label-removing set," and "wine X 750 ml," as merchandise related to the wine.

Thereafter, the CPU 61 generates a purchase Web page for purchasing the related merchandise, on the basis of the data items extracted from the merchandise-information managing area 63a (Step S604). The CPU 61 then transmits the Web page to the portable terminal 8 that has accessed the merchandise-purchase site (Step S605).

How the portable terminal 8 operates when the user orders the related merchandise will be explained, with reference to FIG. 24.

The CPU 11 of the portable terminal 8 receives the Web page for purchasing the related merchandise, sent from the merchandise purchase server 90 (Step S701). The CPU 11 then makes the display unit 17 display the Web page (Step S702).

Figure 27:
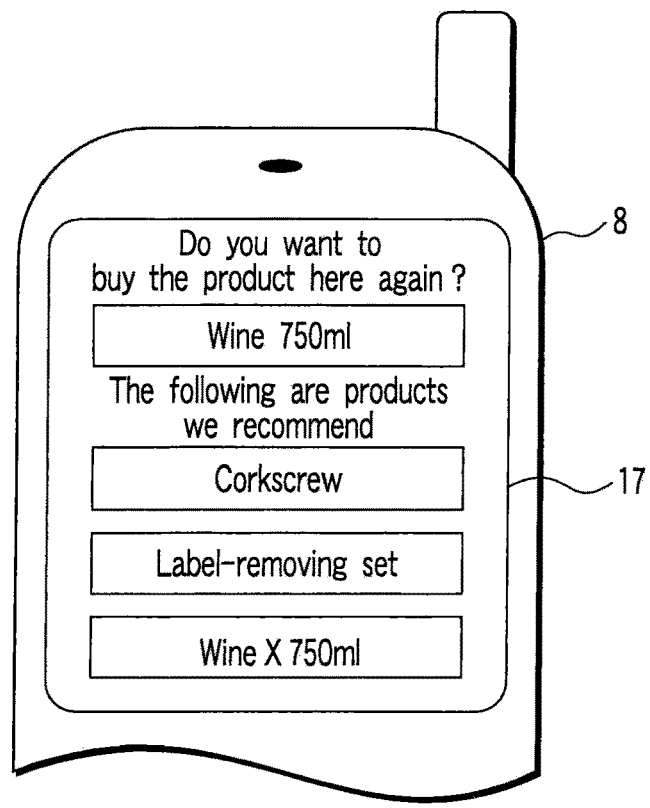
FIG. 27 is a diagram showing another example of information, displayed by the display unit of the portable terminal included in the system according to the second embodiment.

FIG. 27 shows another example of the information displayed by the display unit 17 of the portable terminal 8 at this point. This example of information is displayed when the user accesses "wine 750 ml" four days after he or she has bought the same merchandise, i.e., "wine 750 ml." The merchandise related to "wine 750 ml," i.e., "corkscrew," "label-removing set," and "wine X 750 ml," are displayed. The user can place an order for these related items of merchandise by operating the input unit 18.

The user may operate the input unit 18, moving the cursor to any merchandise he or she would like to order and may push the OK button. Then, the CPU 11 of the portable terminal 8 determines that the user has selected the merchandise (Step S703). The CPU 11 then transmits ordered-merchandise information designating the merchandise selected, to the merchandise purchase server 90 (Step S704). If no merchandise is selected, the CPU 11 transmits data representing the end of process to the merchandise purchase server 90 (Step S705).

The sequence of the major steps of the operation the merchandise purchase server 90 performs when the user of the portable terminal 8 orders merchandise will be explained, with reference to FIG. 25.

The merchandise purchase server 90 keeps activating the merchandise-ordering program P13 at all times and keeps waiting for an access from the portable terminal 8 (Step S801). Upon receiving an order for any merchandise from the portable terminal 8, the CPU 61 of the merchandise purchase server 90 places order for the merchandise to the seller who sells the merchandise (Step S802). After placing the order, the CPU 61 transmits a message to the portable terminal 8, telling that the order has been accepted (Step S803). (The message may read, for example, "The order for the merchandise has been duly accepted.")

In the second embodiment, the portable terminal 8 can access the merchandise purchase server 90 on the basis of the data recorded on the electronic receipt downloaded from the electronic-receipt server 6. The portable terminal 8 further can acquire, from the merchandise purchase server 90, a Web page for ordering any merchandise and merchandise related thereto, and can cause the display unit 17 to display the Web page thus acquired. Using the Web page, the user can easily place an order for the merchandise displayed on the display unit 17.

Thus, it is easy for the user to access the merchandise related to the merchandise purchased. This is very useful for the user, and also to the shops because the merchandise information helps to promote the sales.

In each embodiment described above, the various functions that implement the present invention are recorded in the apparatuses. Nonetheless, the functions may be downloaded into the apparatuses from networks.

Alternatively, similar functions may be installed in the apparatuses, in the form of recording media. The recording medium may be of any types available, such as CD-ROM, so long as they can store programs that the apparatuses can read. The functions, either installed or downloaded, may be of the types that work in cooperation with the operating systems (OS) installed in the apparatuses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for transmitting an electronic receipt comprising:
    an electronic receipt server configured to record the electronic receipt including transaction information regarding a sale of goods and settlement data;
    a portable terminal configured to perform communication with the electronic receipt server by way of the Internet, the portable terminal used by a purchaser; and
    a settlement processing apparatus including a point of sale terminal configured to process the sale of goods, the settlement processing apparatus comprising:
        a memory that stores executable instructions; and
        a processor that executes the executable instructions to perform operations including:
            generating electronic-receipt data based on a result of processing of a merchandise sale;
            generating simplified settlement data based on the electronic receipt data, the simplified settlement data is derived from the settlement data, the simplified settlement data including a transaction date;
            generating ID data for downloading the electronic receipt data, the ID data is for generating an address indicating a region of the electronic receipt server in which the electronic receipt is recorded;

transmitting the electronic receipt data and the ID data to the electronic receipt server; and
transmitting the simplified settlement data and the ID data to the portable terminal;
the portable terminal comprising:
a memory that stores executable instructions; and
a processor that facilitates execution of the executable instructions to perform operations comprising:
receiving the simplified settlement data and the ID data from the settlement processing apparatus;
recording the simplified settlement data in association with the ID data received from the settlement processing apparatus;
displaying on a display unit the simplified data recorded;
generating a download command for downloading the electronic receipt related to the simplified settlement data displayed by the display unit;
generating the address indicating the region of the electronic receipt server in which the electronic receipt is recorded from the ID data recorded in association with the simplified settlement data;
recording the electronic receipt downloaded from the electronic receipt server; and
displaying the electronic receipt based on the electronic receipt data recorded.

2. The portable terminal according to claim 1, further comprising:
a simplified-settlement-data recording unit which records the simplified settlement data corresponding to any electronic receipt recorded in at least the electronic-receipt recording unit, in association with the electronic receipt;
a simplified-list display control unit which causes the display unit to display a list of the simplified settlement data items recorded in the simplified-settlement-data recording unit; and
a selected-receipt display control unit which causes the display unit to display any electronic receipt corresponding to any simplified settlement data, when the input unit is operated, thereby selecting the simplified settlement data from the list displayed by the display unit.

3. The portable terminal according to claim 2, further comprising:
an extracting unit which extracts access data for accessing a merchandise-information site preset for any merchandise, when the input unit is operated, thereby selecting the merchandise from the electronic receipt display by the display unit;
an acquisition unit which acquires related information preset for the merchandise from the merchandise-information site, by accessing the merchandise-information site via the communications unit in accordance with the access data extracted by the extracting unit; and
a related-information display control unit which causes the display unit to display the related information acquired by the acquisition unit.

4. The portable terminal according to claim 2, further comprising:
an extracting unit which extracts access data for accessing a merchandise-purchase site preset for any merchandise, when the input unit is operated, thereby selecting the merchandise from the electronic receipt display by the display unit;
an acquisition unit which acquires a list of merchandise recommended to be purchased, from the merchandise-purchase site, by accessing the merchandise-information site via the communications unit in accordance with the access data extracted by the extracting unit;
a purchase-list display control unit which causes the display unit to display the list of merchandise, acquired by the acquisition unit; and
an order notifying unit which notifies any merchandise, as ordered one, to the merchandise-purchase site when the input unit is operated, thereby selecting the merchandise from the list displayed by the display unit.

5. The portable terminal according to claim 4, wherein the list of merchandise contains the merchandise selected, and any one of items of merchandise related to the merchandise, which remains not purchased for more days than a preset number of days after the merchandise has been purchased.

6. The portable terminal according to claim 3, wherein the display unit displays a menu for the merchandise selected, and the acquisition unit accesses the merchandise-information site via the communications unit and acquires the list of merchandise recommended to be purchased from the merchandise-purchase site, when the input unit is operated, thereby ordering the merchandise in the menu.

7. A method for transmitting an electronic receipt, the method comprising:
recording with an electronic receipt server the electronic receipt including transaction information regarding a sale of goods and settlement data;
performing communication with the electronic receipt server by way of the Internet with a portable terminal used by a purchaser;
processing the sale of goods with a point of sale terminal included with a settlement processing apparatus;
executing instructions stored in a memory of the settlement processing apparatus with a processor of the settlement processing apparatus to perform the following operations:
generating electronic-receipt data based on a result of processing a merchandise sale;
generating simplified settlement data based on the electronic receipt data, the simplified settlement data is derived from the settlement data, the simplified settlement data including a transaction date;
generating ID data for downloading the electronic receipt data, the ID data is for generating an address indicating a region of the electronic receipt server in which the electronic receipt is recorded;
transmitting the electronic receipt data and the ID data to the electronic receipt server; and
transmitting the simplified settlement data and the ID data to the portable terminal;
executing instructions stored in a memory of the portable terminal with a processor of the portable terminal to perform the following operations:
receiving simplified settlement data and ID data from the settlement processing apparatus;
recording the simplified settlement data in association with the ID data received from the settlement processing apparatus;
displaying on a display unit the simplified data recorded;
generating a download command for downloading the electronic receipt related to the simplified settlement data displayed by the display unit;
generating the address indicating the region of the electronic receipt server in which the electronic receipt is recorded from the ID data recorded in association with the simplified settlement data;
recording the electronic receipt downloaded from the electronic receipt server; and
displaying the electronic receipt based on the electronic receipt data recorded.

\* \* \* \* \*